(12) United States Patent
Umezawa et al.

(10) Patent No.: US 10,626,775 B2
(45) Date of Patent: Apr. 21, 2020

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Koji Umezawa, Susono (JP); Kinji Morihiro, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 29 days.

(21) Appl. No.: 16/164,385

(22) Filed: Oct. 18, 2018

(65) Prior Publication Data

US 2019/0136737 A1    May 9, 2019

(30) Foreign Application Priority Data

Nov. 9, 2017 (JP) ................. 2017-216544

(51) Int. Cl.
*F01N 3/00* (2006.01)
*F01N 9/00* (2006.01)
(Continued)

(52) U.S. Cl.
CPC .................. *F01N 9/00* (2013.01); *F01N 3/20* (2013.01); *F01N 3/2882* (2013.01);
(Continued)

(58) Field of Classification Search
CPC .......... F01N 13/009; F01N 3/008; F01N 9/00; F01N 3/20; F01N 3/2882; F01N 11/002;
(Continued)

(56) References Cited

U.S. PATENT DOCUMENTS 6,600,998 B1 * 7/2003 Majima ................. F01N 11/007
  702/184
6,622,478 B2 * 9/2003 Nakamura ............ F01N 3/0814
  60/276
(Continued)

FOREIGN PATENT DOCUMENTS

EP    2 952 714 A1    12/2015
EP    3 118 440 A1    1/2017
(Continued)

*Primary Examiner* — Jason D Shanske
(74) *Attorney, Agent, or Firm* — Finnegan, Henderson, Farabow, Garrett & Dunner, LLP

(57) ABSTRACT

An exhaust purification system of the internal combustion engine comprises: an upstream side catalyst 20 arranged in an exhaust passage, a downstream side catalyst 24 arranged at a downstream side of the upstream side catalyst, an air-fuel ratio sensor 41 detecting an air-fuel ratio of outflowing exhaust gas flowing out from the upstream side catalyst, an air-fuel ratio control part 31 controlling an air-fuel ratio of inflowing exhaust gas flowing into the upstream side catalyst to a target air-fuel ratio, and a temperature calculating part 32 calculating a temperature of the downstream side catalyst. The air-fuel ratio control part switches the first control to the second control when a temperature of the downstream side catalyst calculated by the temperature calculating part rises to a reference temperature which is equal to or higher than an activation temperature of the downstream side catalyst.

12 Claims, 14 Drawing Sheets

(51) Int. Cl.

| | | |
|---|---|---|
| *F01N 3/20* | (2006.01) | |
| *F01N 3/28* | (2006.01) | |
| *F01N 11/00* | (2006.01) | |
| *F02D 41/14* | (2006.01) | |
| *F01N 13/00* | (2010.01) | |
| *F02D 41/02* | (2006.01) | |
| *F01N 3/10* | (2006.01) | |

(52) U.S. Cl.
CPC .......... *F01N 11/002* (2013.01); *F01N 13/008* (2013.01); *F01N 13/009* (2014.06); *F02D 41/0295* (2013.01); *F02D 41/1439* (2013.01); *F02D 41/1456* (2013.01); *F02D 41/1458* (2013.01); *F02D 41/1475* (2013.01); *F01N 3/101* (2013.01); *F01N 11/007* (2013.01); *F01N 13/0093* (2014.06); *F01N 2430/06* (2013.01); *F01N 2550/02* (2013.01); *F01N 2560/025* (2013.01); *F01N 2560/14* (2013.01); *F01N 2900/0408* (2013.01); *F01N 2900/0422* (2013.01); *F01N 2900/0601* (2013.01); *F01N 2900/102* (2013.01); *F01N 2900/1402* (2013.01); *F01N 2900/1602* (2013.01); *F01N 2900/1624* (2013.01); *F02D 2200/0802* (2013.01); *F02D 2200/0804* (2013.01); *F02D 2200/0814* (2013.01); *F02D 2200/0816* (2013.01); *F02D 2250/36* (2013.01)

(58) Field of Classification Search
CPC ............. F02D 41/1439; F02D 41/1456; F02D 41/1458; F02D 41/1475
USPC .......................................................... 60/276
See application file for complete search history.

(56) References Cited

U.S. PATENT DOCUMENTS

| | | | |
|---|---|---|---|
| 6,755,013 B2* | 6/2004 | Uchida | ................. F01N 11/007 60/274 |
| 2003/0017603 A1 | 1/2003 | Uchida et al. | |
| 2016/0265465 A1* | 9/2016 | Yamaguchi | ......... F02D 41/2461 |
| 2017/0101953 A1* | 4/2017 | Takada | ................ F02D 41/0295 |
| 2017/0122242 A1* | 5/2017 | Okazaki | .............. F02D 41/0295 |
| 2017/0248095 A1* | 8/2017 | Okazaki | .............. F02D 41/2432 |
| 2018/0073458 A1* | 3/2018 | Hayashita | ............... F01N 3/101 |

FOREIGN PATENT DOCUMENTS

| | | |
|---|---|---|
| JP | 2003-097334 A | 4/2003 |
| JP | 2015-071959 | 4/2015 |

\* cited by examiner

EXHAUST PURIFICATION SYSTEM OF INTERNAL COMBUSTION ENGINE

FIELD

The present invention relates to an exhaust purification system of an internal combustion engine.

BACKGROUND

It has been known in the past to arrange a catalyst able to store oxygen in an exhaust passage of an internal combustion engine and to remove unburned gas (HC, CO, etc.) and $NO_X$ in the exhaust gas at the catalyst. The higher the oxygen storage ability of the catalyst, the greater the amount of oxygen able to be stored at the catalyst and the more the exhaust purification performance of the catalyst is improved.

To maintain the oxygen storage ability of the catalyst, it is preferable to make the oxygen storage amount of the catalyst fluctuate so that the oxygen storage amount of the catalyst is not maintained constant. In the internal combustion engine described in PTL 1, an upstream side catalyst and a downstream side catalyst are arranged in the exhaust passage, and the oxygen storage amount of the upstream side catalyst is made to fluctuate by two types of control: one-sided failure control and two-sided failure control. In the one-sided failure control and two-sided failure control, the target air-fuel ratio of the exhaust gas flowing into the upstream side catalyst is alternately switched between a lean air-fuel ratio leaner than a stoichiometric air-fuel ratio and a rich air-fuel ratio richer than a stoichiometric air-fuel ratio based on an output of a downstream side air-fuel ratio sensor arranged at a downstream side of the upstream side catalyst etc.

Specifically, in two-sided failure control, when the air-fuel ratio detected by the downstream side air-fuel ratio sensor becomes a rich judged air-fuel ratio richer than the stoichiometric air-fuel ratio or becomes less, the target air-fuel ratio is switched from the rich air-fuel ratio to the lean air-fuel ratio, while when the air-fuel ratio detected by the downstream side air-fuel ratio sensor becomes a lean judged air-fuel ratio leaner than the stoichiometric air-fuel ratio or becomes more, the target air-fuel ratio is switched from the lean air-fuel ratio to the rich air-fuel ratio. Therefore, in two-sided failure control, the oxygen storage amount of the upstream side catalyst fluctuates between zero and the maximum oxygen storage amount. For this reason, the oxygen storage amount of the upstream side catalyst periodically becomes zero or the maximum oxygen storage amount and small amounts of unburned gas and $NO_X$ are exhausted from the upstream side catalyst.

On the other hand, in one-sided failure control, the target air-fuel ratio is switched from the rich air-fuel ratio to the lean air-fuel ratio when the air-fuel ratio detected by the downstream side air-fuel ratio sensor becomes a rich judged air-fuel ratio richer than the stoichiometric air-fuel ratio or becomes less, while the target air-fuel ratio is switched from the lean air-fuel ratio to the rich air-fuel ratio when the oxygen storage amount of the upstream side catalyst becomes the switching storage amount or becomes more. Therefore, in one-sided control, the oxygen storage amount of the upstream side catalyst fluctuates between zero and the switching storage amount. For this reason, the oxygen storage amount of the upstream side catalyst periodically becomes zero and a small amount of unburned gas is exhausted from the upstream side catalyst.

Further, in one-sided failure control, the oxygen storage amount of the upstream side catalyst is calculated based on the output of the upstream side air-fuel ratio sensor arranged at the upstream side of the upstream side catalyst. For this reason, even if the maximum oxygen storage amount of the upstream side catalyst becomes less than the switching storage amount due to deterioration etc., the target air-fuel ratio is maintained at the lean air-fuel ratio until the calculated oxygen storage amount reaches the switching storage amount. As a result, after the oxygen storage amount of the upstream side catalyst reaches the maximum oxygen storage amount, a large amount of $NO_X$ flows out from the upstream side catalyst and the exhaust emission deteriorates.

In the internal combustion engine described in PTL 1, to solve this technical problem, one-sided failure control is performed when the maximum oxygen storage amount of the upstream side catalyst is equal to or larger than a predetermined value, and two-sided failure control is performed when the maximum oxygen storage amount of the upstream side catalyst is less than a predetermined value.

CITATION LIST

Patent Literature

[PTL 1] Japanese Patent Publication No. 2015-071959A

SUMMARY

Technical Problem

The unburned gas and $NO_X$ flowing out from the upstream side catalyst basically are removed by the downstream side catalyst. However, when the downstream side catalyst is in the inactive state, the purification performance of the downstream side catalyst falls, so a part of the unburned gas and $NO_X$ flowing into the downstream side catalyst is not removed by the downstream side catalyst. For this reason, when, as described in PTL 1, if two-sided failure control is constantly performed when the maximum oxygen storage amount of the upstream side catalyst is less than a predetermined value, unburned gas and $NO_X$ flow out from the downstream side catalyst and the exhaust emission is liable to deteriorate.

Therefore, in view of the above problem, an object of the present invention is to keep the exhaust emission from deteriorating when making the oxygen storage amount of the catalyst fluctuate in an internal combustion engine.

Solution to Problem

The summary of the present disclosure is as follows.

(1) An exhaust purification system of the internal combustion engine comprising: an upstream side catalyst arranged in an exhaust passage and able to store oxygen; a downstream side catalyst arranged at a downstream side of the upstream side catalyst in the direction of flow of exhaust and able to store oxygen; an air-fuel ratio sensor arranged between the upstream side catalyst and the downstream side catalyst and detecting an air-fuel ratio of outflowing exhaust gas flowing out from the upstream side catalyst; an air-fuel ratio control part configured to control an air-fuel ratio of inflowing exhaust gas flowing into the upstream side catalyst to a target air-fuel ratio; and a temperature calculating part configured to calculate a temperature of the downstream side catalyst, wherein the air-fuel ratio control part is configured to perform first control and second control, in the first control, the air-fuel ratio control part is configured to set the target air-fuel ratio to a first set air-fuel ratio deviating from the stoichiometric air-fuel ratio to a second side at an opposite side from a first side when an air-fuel ratio detected by the air-fuel ratio sensor reaches a judged air-fuel ratio deviating to the first side from the stoichiometric air-fuel ratio, and set the target air-fuel ratio to a second set air-fuel ratio deviating to the first side from the stoichiometric air-fuel ratio when judging that an amount of change of an oxygen storage amount of the upstream side catalyst when the target air-fuel ratio is maintained at an air-fuel ratio deviating to the second side from the stoichiometric air-fuel ratio has reached a reference amount smaller than a maximum oxygen storage amount of the upstream side catalyst, in the second control, the air-fuel ratio control part is configured to set the target air-fuel ratio to a lean set air-fuel ratio leaner than the stoichiometric air-fuel ratio when an air-fuel ratio detected by the air-fuel ratio sensor reaches a rich judged air-fuel ratio richer than the stoichiometric air-fuel ratio, and set the target air-fuel ratio to a rich set air-fuel ratio richer than the stoichiometric air-fuel ratio when the air-fuel ratio detected by the air-fuel ratio sensor reaches a lean judged air-fuel ratio leaner than the stoichiometric air-fuel ratio, and the air-fuel ratio control part is configured to switch the first control to the second control when a temperature of the downstream side catalyst calculated by the temperature calculating part rises to a reference temperature which is equal to or higher than an activation temperature of the downstream side catalyst.

(2) The exhaust purification system of an internal combustion engine described in above (1), further comprising a catalyst deterioration calculating part configured to calculate a degree of deterioration of the downstream side catalyst, wherein the air-fuel ratio control part is configured to raise the reference temperature the larger the degree of deterioration of the downstream side catalyst calculated by the catalyst deterioration calculating part.

(3) The exhaust purification system of an internal combustion engine described in above (1) or (2), further comprising a catalyst deterioration calculating part configured to calculate a degree of deterioration of the downstream side catalyst, wherein the air-fuel ratio control part is configured to raise the reference temperature the larger the degree of deterioration of the downstream side catalyst calculated by the catalyst deterioration calculating part.

(4) The exhaust purification system of an internal combustion engine described in above (3), wherein the catalyst deterioration calculating part is configured to calculate the degree of deterioration of the downstream side catalyst based on a temperature history of the downstream side catalyst.

(5) The exhaust purification system of an internal combustion engine described in above (4), wherein the catalyst deterioration calculating part is configured to calculate the degree of deterioration of the downstream side catalyst based on a total of a time period during which fuel cut control where a supply of fuel to a combustion chamber of the internal combustion engine is stopped is performed.

(6) The exhaust purification system of an internal combustion engine described in above (3), wherein the catalyst deterioration calculating part is configured to calculate the degree of deterioration of the downstream side catalyst based on a total running distance of a vehicle mounting the internal combustion engine or a total operating time of the internal combustion engine.

(7) The exhaust purification system of an internal combustion engine described in any one of above (1) to (6), wherein the first side is a rich side and the second side is a lean side.

(8) The exhaust purification system of an internal combustion engine described in any one of above (1) to (6), wherein the first side is a lean side and the second side is a rich side.

Advantageous Effects of Invention

According to the present invention, it is possible to keep the exhaust emission from deteriorating when making the oxygen storage amount of the catalyst fluctuate in an internal combustion engine.

DESCRIPTION OF EMBODIMENTS

Figure 1:
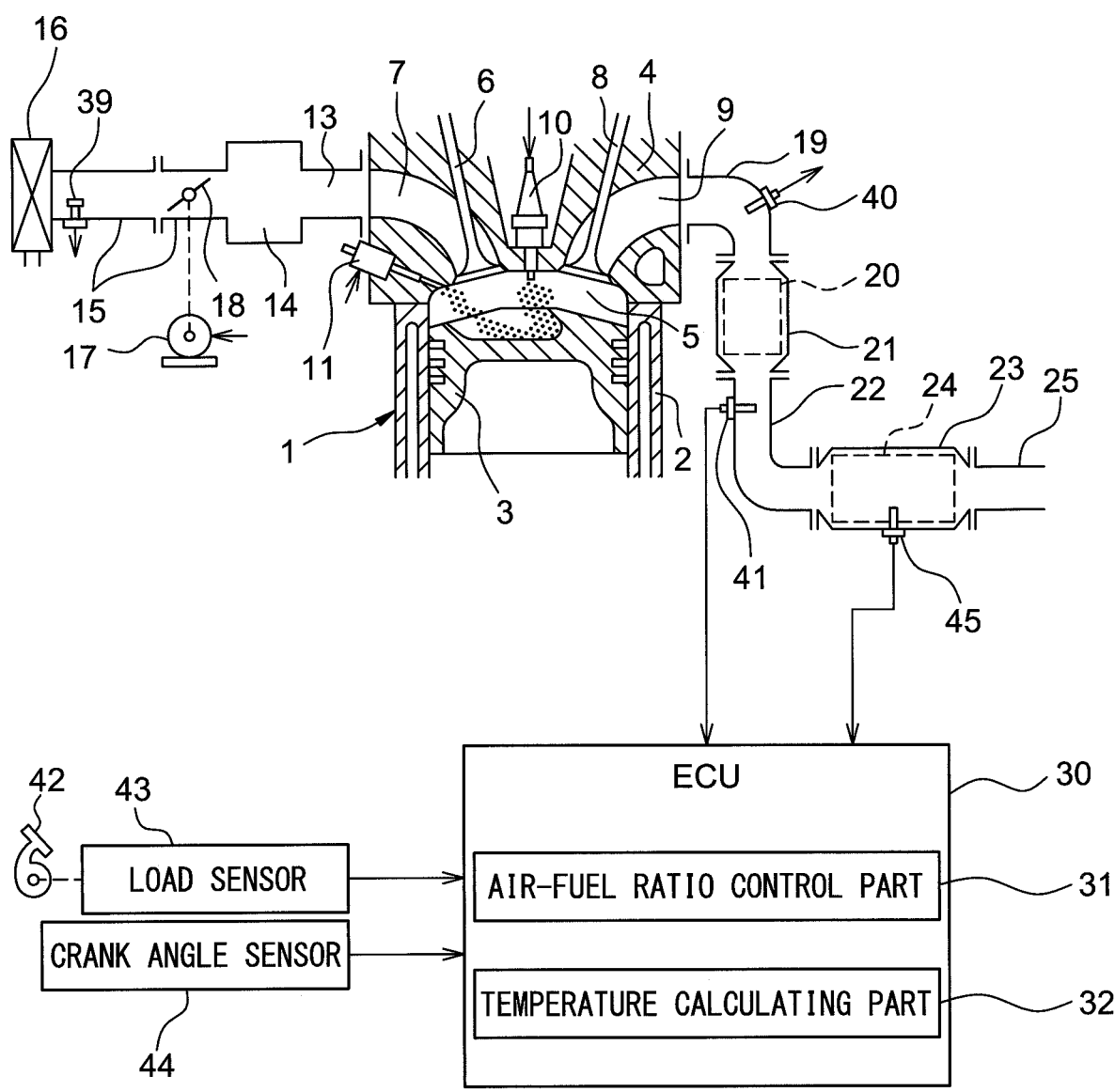
FIG. 1 is a view schematically showing an internal combustion engine in which an exhaust purification system of an internal combustion engine according to a first embodiment of the present invention is provided.

Below, referring to the figures, embodiments of the present invention will be explained in detail. Note that, in the following explanation, similar components are assigned the same reference numerals.

First Embodiment

First, referring to FIG. 1 to FIG. 11, a first embodiment of the present invention will be explained.

Explanation of Internal Combustion Engine Overall

FIG. 1 is a view schematically showing an internal combustion engine provided with an exhaust purification system of an internal combustion engine according to a first embodiment of the present invention. The internal combustion engine shown in FIG. 1 is a spark ignition type internal combustion engine. The internal combustion engine is mounted in a vehicle.

Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. In the present embodiment, as the fuel, gasoline with a stoichiometric air-fuel ratio of 14.6 is used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, intake pipe 15, etc., form an intake passage which leads air to the combustion chamber 5. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side catalyst 20 built into it. The upstream side casing 21 is connected to a downstream side casing 23 which has a downstream side catalyst 24 built into it via an exhaust pipe 22. The exhaust port 9, exhaust manifold 19, upstream side casing 21, exhaust pipe 22, downstream side casing 23, etc., form an exhaust passage which discharges exhaust gas produced due to combustion of the air-fuel mixture in the combustion chamber 5.

The various controls of the internal combustion engine are performed by an electronic control unit (ECU) 30. The electronic control unit (ECU) 30 includes a central processing unit (CPU), a memory such as a ROM and RAM, an input port, an output port, etc. The ECU 30 controls the various actuators of the internal combustion engine based on the outputs of various sensors of the internal combustion engine etc.

In the intake pipe 15, an air flow meter 39 detecting a flow rate of air flowing through the inside of the intake pipe 15 is arranged. The air flow meter 39 is electrically connected to the ECU 30, and the output of the air flow meter 39 is input to the ECU 30.

Further, in the header of the exhaust manifold 19, that is, at the upstream side of the upstream side catalyst 20 in the direction of flow of exhaust, an upstream side air-fuel ratio sensor 40 for detecting the air-fuel ratio of the exhaust gas flowing into the exhaust manifold 19 (that is, the exhaust gas flowing into the upstream side catalyst 20), is arranged. The upstream side air-fuel ratio sensor 40 is electrically connected to the ECU 30, and the output of the upstream side air-fuel ratio sensor 40 is input to the ECU 30.

Further, inside the exhaust pipe 22, that is, between the upstream side catalyst 20 and the downstream side catalyst 24, a downstream side air-fuel ratio sensor 41 for detecting the air-fuel ratio of the exhaust gas flowing through the inside of the exhaust pipe 22 (that is, the exhaust gas flowing out from the upstream side catalyst 20) is arranged. The downstream side air-fuel ratio sensor 41 is electrically connected to the ECU 30, and the output of the downstream side air-fuel ratio sensor 41 is input to the ECU 30.

Further, the vehicle mounting the internal combustion engine is provided with an accelerator pedal 42. A load sensor 43 is connected to the accelerator pedal 42. The load sensor 43 generates an output proportional to the amount of depression of the accelerator pedal 42, that is, the engine load. The load sensor 43 is electrically connected to the ECU 30. The output of the load sensor 43 is input to the ECU 30.

Further, the internal combustion engine is provided with a crank angle sensor 44. The crank angle sensor 44 for example generates an output pulse each time the crankshaft rotates 15 degrees. The crank angle sensor 44 is electrically connected to the ECU 30. The output of the crank angle sensor 44 is input to the ECU 30. The ECU 30 calculates the engine speed based on the output of the crank angle sensor 44.

Further, the ECU 30 is electrically connected to spark plugs 10, fuel injectors 11, and a throttle valve driving actuators 17 and controls the same. Specifically, the ECU 30 controls the ignition timings of the spark plugs 10, the fuel injection timings and fuel injection amounts of the fuel injectors 11, and the opening degree of the throttle valve 18.

Note that, the above-mentioned internal combustion engine is a nonsupercharged internal combustion engine fueled by gasoline, but the configuration of the internal combustion engine is not limited to the above configuration. Therefore, the cylinder array, mode of injection of fuel, configuration of the intake and exhaust systems, configuration of the valve operating mechanism, presence of any supercharger, and other specific parts of the configuration of the internal combustion engine may differ from the configuration shown in FIG. 1. For example, the fuel injectors 11 may be arranged to inject fuel into the intake ports 7.

Explanation of Catalysts

The upstream side catalyst 20 and the downstream side catalyst 24 are arranged in the exhaust passage, and the downstream side catalyst 24 is arranged at an downstream side of the upstream side catalyst 20 in the direction of flow of exhaust. The upstream side catalyst 20 and the downstream side catalyst 24 have similar configurations. The catalysts 20 and 24 are catalysts having oxygen storage abilities, for example, three-way catalysts. Specifically, the catalysts 20 and 24 are comprised of carriers made of ceramic on which a precious metal having a catalytic action (for example, platinum (Pt)) and a co-catalyst having an oxygen storage ability (for example, ceria ($CeO_2$)) are carried.

Figure 2:
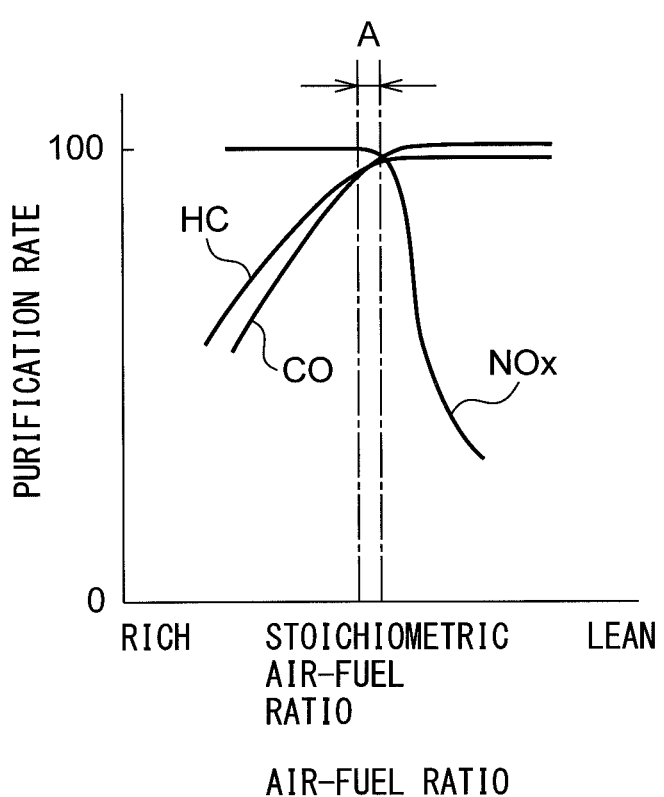
FIG. 2 shows purification characteristics of a three-way catalyst.

FIG. 2 shows the purification characteristics of a three-way catalyst. As shown in FIG. 2, the purification rates of unburned gas (HC, CO) and nitrogen oxides ($NO_X$) by the catalysts 20 and 24 become extremely high when the air-fuel ratio of the exhaust gas flowing into the catalysts 20 and 24 is in the region near the stoichiometric air-fuel ratio (purification window A in FIG. 2). Therefore, the catalysts 20 and 24 can effectively remove unburned gas and $NO_X$ if the air-fuel ratio of the exhaust gas is maintained at the stoichiometric air-fuel ratio.

Further, the catalysts 20 and 24 store or release oxygen in accordance with the air-fuel ratio of the exhaust gas by the co-catalyst. Specifically, the catalysts 20 and 24 store excess oxygen in the exhaust gas when the air-fuel ratio of the exhaust gas is leaner than the stoichiometric air-fuel ratio. On the other hand, the catalysts 20 and 24 release the amount of additional oxygen required for making the unburned gas oxidize when the air-fuel ratio of the exhaust gas is richer than the stoichiometric air-fuel ratio. As a result, even if the air-fuel ratio of the exhaust gas is somewhat off from the stoichiometric air-fuel ratio, the air-fuel ratio on the surface of the catalysts 20 and 24 is maintained near the stoichiometric air-fuel ratio and the unburned gas and $NO_X$ are effectively removed at the catalysts 20 and 24.

Note that, so long as the catalysts 20 and 24 have catalytic actions and oxygen storage abilities, they may be catalysts other than three-way catalysts.

Output Characteristics of Air-Fuel Ratio Sensors

Figure 3:
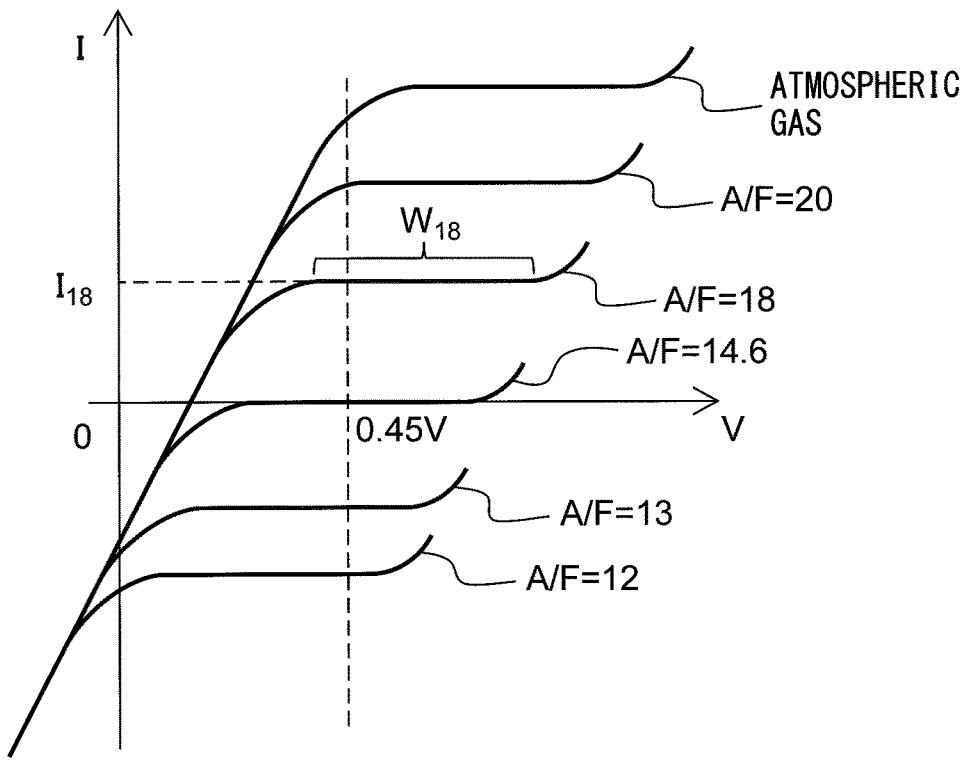
FIG. 3 is a view showing a relationship of a sensor applied voltage and output current at different exhaust air-fuel ratios.
Figure 4:
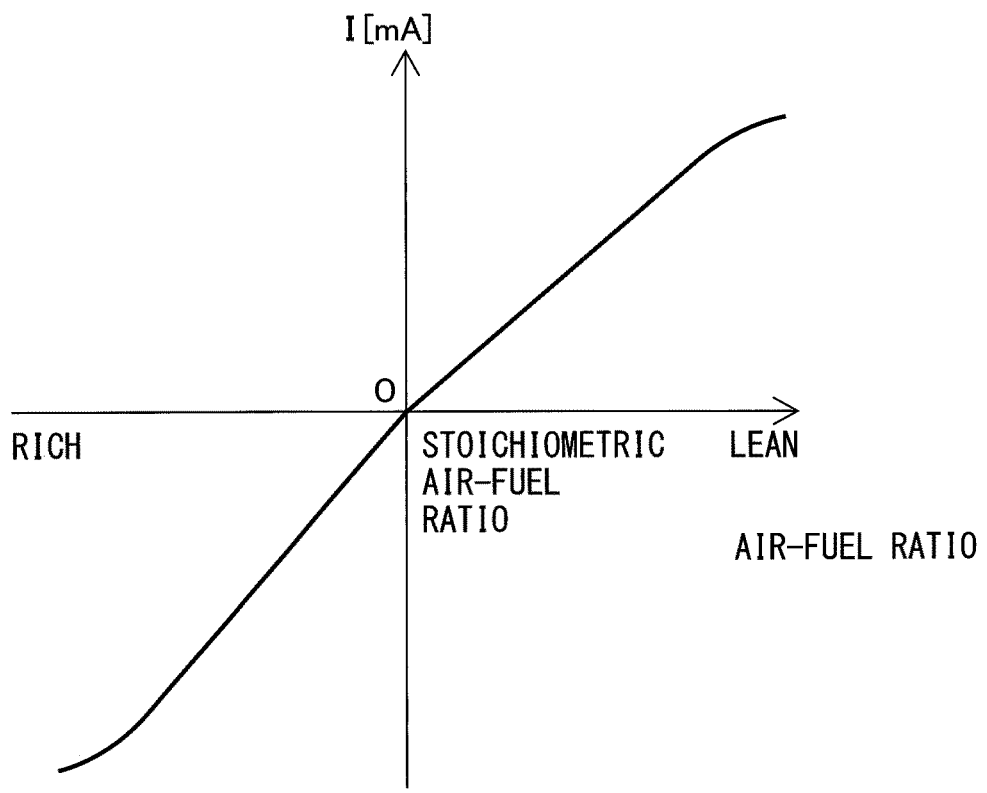
FIG. 4 is a view showing a relationship of an exhaust air-fuel ratio and output current when making the sensor applied voltage constant.

Next, referring to FIG. 3 and FIG. 4, the output characteristics of the air-fuel ratio sensors 40, 41 in the present embodiment will be explained. FIG. 3 is a view showing the voltage-current (V-I) characteristics of the air-fuel ratio sensors 40, 41 in the present embodiment, while FIG. 4 is a view showing the relationship between the air-fuel ratio of the exhaust gas circulating around the air-fuel ratio sensors 40, 41 (below, referred to as the "exhaust air-fuel ratio") and the output current I when maintaining the applied voltage constant. Note that, in the present embodiment, as the air-fuel ratio sensors 40, 41, the same configurations of air-fuel ratio sensors are used.

As will be understood from FIG. 3, in the air-fuel ratio sensors 40, 41 of the present embodiment, the output current I becomes larger the higher the exhaust air-fuel ratio (the leaner). Further, in the V-I line of each exhaust air-fuel ratio, there is a region substantially parallel to the V-axis, that is, a region where the output current does not change much at all even if the applied voltage changes. This voltage region is called the "limit current region". The current at this time is called the "limit current". In FIG. 3, the limit current region and the limit current when the exhaust air-fuel ratio is 18 are respectively shown by $W_{18}$ and $I_{18}$. Therefore, the air-fuel ratio sensors 40, 41 are limit current type air-fuel ratio sensors.

FIG. 4 is a view showing the relationship between the exhaust air-fuel ratio and the output current I when making the applied voltage 0.45V or so. As will be understood from FIG. 4, in the air-fuel ratio sensors 40, 41, the higher the exhaust air-fuel ratio (that is, the leaner), the greater the output current I of the air-fuel ratio sensors 40, 41 becomes. In addition, the air-fuel ratio sensors 40, 41 are configured so that the output current I becomes zero when the exhaust air-fuel ratio is the stoichiometric air-fuel ratio. Accordingly, the air-fuel ratio sensors 40, 41 can continuously (linearly) detect the exhaust air-fuel ratio. Note that, when the exhaust air-fuel ratio becomes larger by a certain extent or more or when it becomes smaller by a certain extent or less, the ratio of the change of the output current with respect to the change of the exhaust air-fuel ratio becomes smaller.

Note that, in the above example, as the air-fuel ratio sensors 40, 41, limit current type air-fuel ratio sensors are used. However, so long as the output current linearly changes with respect to the exhaust air-fuel ratio, as the air-fuel ratio sensors 40, 41, it is also possible to use any other air-fuel ratio sensors such as air-fuel ratio sensors not the limit current type. Further, the air-fuel ratio sensors 40, 41 may be air-fuel ratio sensors of structures different from each other.

Exhaust Purification System of Internal Combustion Engine

Below, an exhaust purification system of an internal combustion engine according to a first embodiment of the present invention (below, simply referred to as the "exhaust purification system") will be explained. The exhaust purification system comprises an upstream side catalyst 20, downstream side catalyst 24, upstream side air-fuel ratio sensor 40, downstream side air-fuel ratio sensor 41, air-fuel ratio control part 31 and temperature calculating part 32. In the present embodiment, the ECU 31 functions as the air-fuel ratio control part 31 and temperature calculation part 32.

The temperature calculating part 32 calculates the temperature of the downstream side catalyst 24. In the present embodiment, a temperature sensor 45 is provided at a downstream side casing 23 housing the downstream side catalyst 24. The temperature sensor 45 detects the temperature of the downstream side catalyst 24 (bed temperature). The temperature sensor 45 is electrically connected to the ECU 30 and the output of the temperature sensor 45 is input to the ECU 30. The temperature calculating part 32 calculates the temperature of the downstream side catalyst 24 based on the output of the temperature sensor 45.

Note that, the temperature sensor 45 may be arranged so as to be close to the downstream side catalyst 24 inside the exhaust pipe 22 at the upstream side of the downstream side catalyst 24 in the direction of flow of exhaust or inside the exhaust pipe 25 at the downstream side of the downstream side catalyst 24 in the direction of flow of exhaust. In this case, the temperature sensor 45 detects the temperature of the exhaust gas flowing into the downstream side catalyst 24 or the temperature of the exhaust gas flowing out from the downstream side catalyst 24.

Further, the temperature calculating part 32 may calculate the temperature of the downstream side catalyst 24 based on the operating parameters of the internal combustion engine. In this case, the temperature sensor 45 is omitted. For example, the temperature calculating part 32 calculates the temperature of the downstream side catalyst 24 based on the cumulative intake air amount from the startup of the internal combustion engine. In this case, the temperature calculating part 32 uses a map showing the relationship of the cumulative intake air amount and the temperature of the downstream side catalyst 24 to calculate the temperature of the downstream side catalyst 24. This map is prepared so that the temperature of the downstream side catalyst 24 becomes higher the greater the cumulative intake air amount. The cumulative intake air amount is calculated by cumulatively adding the intake air amount detected by the air flow meter 39.

The air-fuel ratio control part 31 controls the air-fuel ratio of the exhaust gas flowing into the upstream side catalyst 20 (below, referred to as the "inflowing exhaust gas") to a target air-fuel ratio. Specifically, the air-fuel ratio control part 31 sets the target air-fuel ratio of the inflowing exhaust gas and controls the amount of fuel supplied to the combustion chambers 5 so that the air-fuel ratio of the inflowing exhaust gas matches the target air-fuel ratio. In the present embodiment, the air-fuel ratio control part 31 controls by feedback the amount of fuel supplied to the combustion chambers 5 so that the output air-fuel ratio of the upstream side air-fuel ratio sensor 40 matches the target air-fuel ratio. Note that, "the output air-fuel ratio" means the air-fuel ratio corresponding to the output value of the air-fuel ratio sensor, that is, the air-fuel ratio detected by the air-fuel ratio sensor.

Further, the air-fuel ratio control part 31 may, without using the upstream side air-fuel ratio sensor 40, control the amount of fuel supplied to the combustion chambers 5 so that the air-fuel ratio of the inflowing exhaust gas matches the target air-fuel ratio. In this case, the air-fuel ratio control part 31 supplies the combustion chambers 5 with the amount of fuel calculated from the intake air amount detected by the air flow meter 39 and the target air-fuel ratio so that the ratio of the fuel and air supplied to the combustion chambers 5 matches the target air-fuel ratio.

The air-fuel ratio control part 31 performs first control and second control to make the oxygen storage amount of the upstream side catalyst 20 fluctuate and thereby suppress the drop in the oxygen storage ability of the upstream side catalyst 20. The air-fuel ratio control part 31 alternately switches the target air-fuel ratio of the inflowing exhaust gas between an air-fuel ratio richer than the stoichiometric air-fuel ratio and an air-fuel ratio leaner than the stoichiometric air-fuel ratio in the first control and the second control.

First Control

Specifically, in the first control, the air-fuel ratio control part 31, sets the target air-fuel ratio to the first set air-fuel ratio deviated to the second side at the opposite side to the first side from the stoichiometric air-fuel ratio when the output air-fuel ratio of the downstream side air-fuel ratio sensor 41 reaches the judged air-fuel ratio deviated to the first side from the stoichiometric air-fuel ratio, and sets the target air-fuel ratio to the second set air-fuel ratio deviated to the first side from the stoichiometric air-fuel ratio when it is judged that the amount of change of the oxygen storage amount of the upstream side catalyst 20 when the target air-fuel ratio is maintained at an air-fuel ratio deviated to the second side from the stoichiometric air-fuel ratio reaches a reference amount. The reference amount is preset and is set to a value smaller than the maximum oxygen storage amount of the upstream side catalyst 20. Note that, the first control will also be called the "one-sided failure control".

The air-fuel ratio control part 31 cumulatively adds the oxygen excess/deficiency of the inflowing exhaust gas with respect to the stoichiometric air-fuel ratio to calculate the amount of change of the oxygen storage amount of the upstream side catalyst 20. Note that, the oxygen excess/deficiency of the inflowing exhaust gas with respect to the stoichiometric air-fuel ratio means the amount of oxygen becoming in excess or the amount of oxygen becoming deficient when trying to make the air-fuel ratio of the inflowing exhaust gas the stoichiometric air-fuel ratio. When the air-fuel ratio of the inflowing exhaust gas is leaner than the stoichiometric air-fuel ratio, the upstream side catalyst 20 stores oxygen, so the value of the oxygen excess/deficiency becomes positive. On the other hand, when the air-fuel ratio of the inflowing exhaust gas is richer than the stoichiometric air-fuel ratio, the upstream side catalyst 20 releases oxygen, so the value of the oxygen excess/deficiency becomes negative.

For this reason, when the air-fuel ratio of the inflowing exhaust gas is leaner than the stoichiometric air-fuel ratio, the air-fuel ratio control part 31 calculates the amount of change of the oxygen storage amount of the upstream side catalyst 20 as the cumulative value of the oxygen excess/deficiency of the inflowing exhaust gas with respect to the stoichiometric air-fuel ratio. Further, when the air-fuel ratio of the inflowing exhaust gas is richer than the stoichiometric air-fuel ratio, the air-fuel ratio control part 31 calculates the amount of change of the oxygen storage amount of the upstream side catalyst 20 as the absolute value of the cumulative value of the oxygen excess/deficiency of the inflowing exhaust gas with respect to the stoichiometric air-fuel ratio.

The oxygen excess/deficiency OED, for example, is calculated by the following formula (1) based on the output of the upstream side air-fuel ratio sensor 40 and the amount of fuel injection:

$$OED = 0.23 \times (AFup - 14.6) \times Qi \quad (1)$$

where, 0.23 is the concentration of oxygen in the air, 14.6 is the stoichiometric air-fuel ratio, Qi is the amount of fuel injection, and AFup is the output air-fuel ratio of the upstream side air-fuel ratio sensor 40.

Note that, the oxygen excess/deficiency OED may be calculated by the following formula (2) based on the output of the upstream side air-fuel ratio sensor 40 and the intake air amount:

$$OED = 0.23 \times (AFup - 14.6) \times Ga / AFup \quad (2)$$

where, 0.23 is the concentration of oxygen in the air, 14.6 is the stoichiometric air-fuel ratio, Ga is the intake air amount, and AFup is the output air-fuel ratio of the upstream side air-fuel ratio sensor 40. The intake air amount Ga is detected by the air flow meter 39.

Further, the oxygen excess/deficiency OED may be calculated based on the target air-fuel ratio of the inflowing exhaust gas without using the output of the upstream side air-fuel ratio sensor 40. In this case, in the above formulas (1) and (2), the value of the target air-fuel ratio is used instead of the output air-fuel ratio AFup of the upstream side air-fuel ratio sensor 40.

Figure 5:
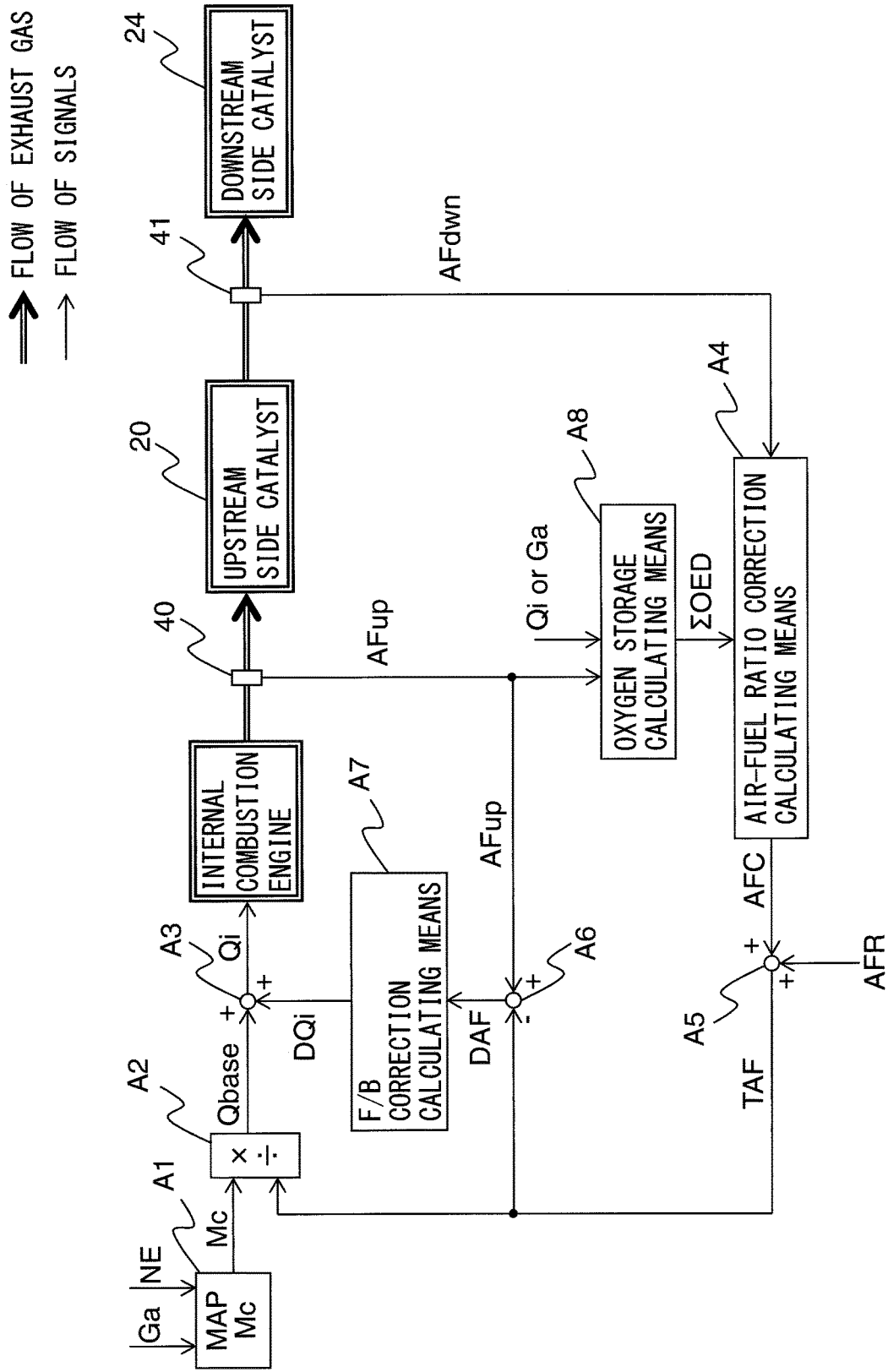
FIG. 5 is a block diagram of control of first control.

FIG. 5 is a block diagram of control for the first control. The air-fuel ratio control part 31 includes the functional blocks A1 to A8. Below, the functional blocks will be explained.

First, the calculation of the fuel injection amount will be explained. To calculate the fuel injection amount, the cylinder intake air calculating means A1, the basic fuel injection calculating means A2, and the fuel injection calculating means A3 are used.

The cylinder intake air calculating means A1 uses a map or calculation formula stored in the ECU 30 to calculate the intake air amount Mc to the cylinders based on the intake air amount Ga and the engine speed NE. The intake air amount Ga is detected by the air flow meter 39, while the engine speed NE is calculated based on the output of the crank angle sensor 44.

The basic fuel injection calculating means A2 divides the cylinder intake air amount Mc calculated by the cylinder intake air calculating means A1 by the target air-fuel ratio TAF to calculate the basic fuel injection amount Qbase (Qbase=Mc/TAF). The target air-fuel ratio TAF is calculated by the later explained target air-fuel ratio setting means A5.

The fuel injection calculating means A3 adds the basic fuel injection amount Qbase calculated by the basic fuel injection calculating means A2 and the later explained F/B correction amount DQi to calculate the fuel injection amount Qi (Qi=Qbase+DQi). An instruction for injection is given to the fuel injectors 11 so that fuel of the fuel injection amount Qi calculated in this way is injected from the fuel injectors 11.

Next, calculation of the target air-fuel ratio will be explained. For calculation of the target air-fuel ratio, the air-fuel ratio correction calculating means A4, target air-fuel ratio setting means A5 and oxygen storage calculating means A8 are used.

The oxygen storage amount calculating means A8 calculates the oxygen excess/deficiency by the above formula (1) or (2) based on the output air-fuel ratio AFup of the upstream side air-fuel ratio sensor 40 and the fuel injection amount Qi calculated by the fuel injection calculating means A3 or the intake air amount Ga. Further, the oxygen storage amount calculating means A8 cumulatively adds the oxygen excess/deficiency to calculate the cumulative oxygen excess/deficiency $\Sigma OED$.

In the air-fuel ratio correction calculating means A4, the air-fuel ratio correction amount AFC of the target air-fuel ratio is calculated based on the cumulative oxygen excess/deficiency $\Sigma OED$ calculated by the oxygen storage calculating means A8, and the output air-fuel ratio AFdwn of the downstream side air-fuel ratio sensor 41.

The target air-fuel ratio setting means A5 adds the air-fuel ratio correction amount AFC calculated by the air-fuel ratio correction calculating means A4 to the control center air-fuel ratio AFR (in the present embodiment, the stoichiometric air-fuel ratio) to calculate the target air-fuel ratio TAF. The thus calculated target air-fuel ratio TAF is input to the basic fuel injection calculating means A2 and later explained air-fuel ratio deviation calculating means A6.

Next, the calculation of the F/B correction amount based on the output air-fuel ratio AFup of the upstream side air-fuel ratio sensor 40 will be explained. To calculate the F/B correction amount, the air-fuel ratio deviation calculating means A6 and F/B correction calculating means A7 are used.

The air-fuel ratio deviation calculating means A6 subtracts the target air-fuel ratio TAF calculated by the target air-fuel ratio setting means A5 from the output air-fuel ratio AFup of the upstream side air-fuel ratio sensor 40 to calculate the deviation of air-fuel ratio DAF (DAF=AFup−TAF). This deviation of air-fuel ratio DAF is a value indicating the excess/deficiency of the amount of supply of fuel with respect to the target air-fuel ratio TAF.

The F/B correction calculating means A7 processes the deviation of air-fuel ratio DAF calculated by the air-fuel ratio deviation calculating means A6 by proportional integral differential processing (PID processing) to calculate the F/B correction amount DQi for compensating for the excess or deficiency of the amount of supply of fuel based on the following formula (3). The thus calculated F/B correction amount DQi is input to the fuel injection calculating means A3.

$$DQi=Kp \cdot DAF+Ki \cdot SDAF+Kd \cdot DDAF \quad (3)$$

In the above formula (3), Kp is a preset proportional gain (proportional constant), Ki is the preset integral gain (integral constant), and Kd is the preset differential gain (differential constant). Further, DDAF is the time differential of the deviation of air-fuel ratio DAF and is calculated by dividing the deviation between the currently updated deviation of air-fuel ratio DAF and the previous deviation of air-fuel ratio DAF by the time corresponding to the updating interval. Further, SDAF is the time integral of the deviation of air-fuel ratio DAF and is calculated by adding the currently updated deviation of air-fuel ratio DAF to the previous time integral SDAF.

Note that, if feedback control based on the output of the upstream side air-fuel ratio sensor 40 is not performed, the air-fuel ratio deviation calculating means A6 and F/B correction calculating means A7 are not used for the air-fuel ratio control. In this case, the air-fuel ratio deviation calculating means A6 and F/B correction calculating means A7 are deleted from the block diagram of control shown in FIG. 5. Further, if the oxygen excess/deficiency is calculated based on the target air-fuel ratio of the inflowing exhaust gas instead of the output of the upstream side air-fuel ratio sensor 40, the target air-fuel ratio TAF is input to the oxygen storage calculating means A8 instead of the output air-fuel ratio AFup of the upstream side air-fuel ratio sensor 40.

In the present embodiment, in the first control, the first side is the rich side, while the second side is the lean side. In this case, the first control is also referred to as the "rich failure control" and is performed as follows: The air-fuel ratio control part 31 sets the target air-fuel ratio to the first lean set air-fuel ratio leaner than the stoichiometric air-fuel ratio when the output air-fuel ratio of the downstream side air-fuel ratio sensor 41 reaches a first rich judged air-fuel ratio richer than the stoichiometric air-fuel ratio. Further, the air-fuel ratio control part 31 sets the target air-fuel ratio to the first rich set air-fuel ratio richer than the stoichiometric air-fuel ratio when judging that the amount of change of the oxygen storage amount of the upstream side catalyst 20 when the target air-fuel ratio is maintained at the air-fuel ratio leaner than the stoichiometric air-fuel ratio reaches the reference amount.

The first rich set air-fuel ratio, the first rich judged air-fuel ratio, and the first lean set air-fuel ratio are preset. The first rich set air-fuel ratio is, for example, 14 to 14.5. The first rich judged air-fuel ratio is an air-fuel ratio leaner than the first rich set air-fuel ratio, for example, is 14.55. The first lean set air-fuel ratio is, for example, 14.7 to 16.5. The reference amount is preset and is set to a value smaller than the maximum oxygen storage amount of the upstream side catalyst 20.

Second Control

On the other hand, in the second control, the air-fuel ratio control part 31, sets the target air-fuel ratio to a lean set air-fuel ratio leaner than the stoichiometric air-fuel ratio when the output air-fuel ratio of the downstream side air-fuel ratio sensor 41 reaches a rich judged air-fuel ratio richer than the stoichiometric air-fuel ratio, and sets the target air-fuel ratio to a rich set air-fuel ratio richer than the stoichiometric air-fuel ratio when the output air-fuel ratio of the downstream side air-fuel ratio sensor 41 reaches a lean judged air-fuel ratio leaner than the stoichiometric air-fuel ratio. Note that, the second control is also called "two-sided failure control".

The rich set air-fuel ratio, the rich judged air-fuel ratio, the lean set air-fuel ratio, and the lean judged air-fuel ratio are preset. The rich set air-fuel ratio is, for example, 14 to 14.5. The rich set air-fuel ratio may be a value the same as or a value different from the first rich set air-fuel ratio in the first control. The rich judged air-fuel ratio is an air-fuel ratio leaner than the rich set air-fuel ratio, for example, is 14.55. The rich judged air-fuel ratio may be a value the same as or a value different from the first rich judged air-fuel ratio in the first control. The lean set air-fuel ratio is, for example, 14.7 to 16.5. The lean judged air-fuel ratio is an air-fuel ratio richer than the lean set air-fuel ratio, for example, is 14.65.

Figure 6:
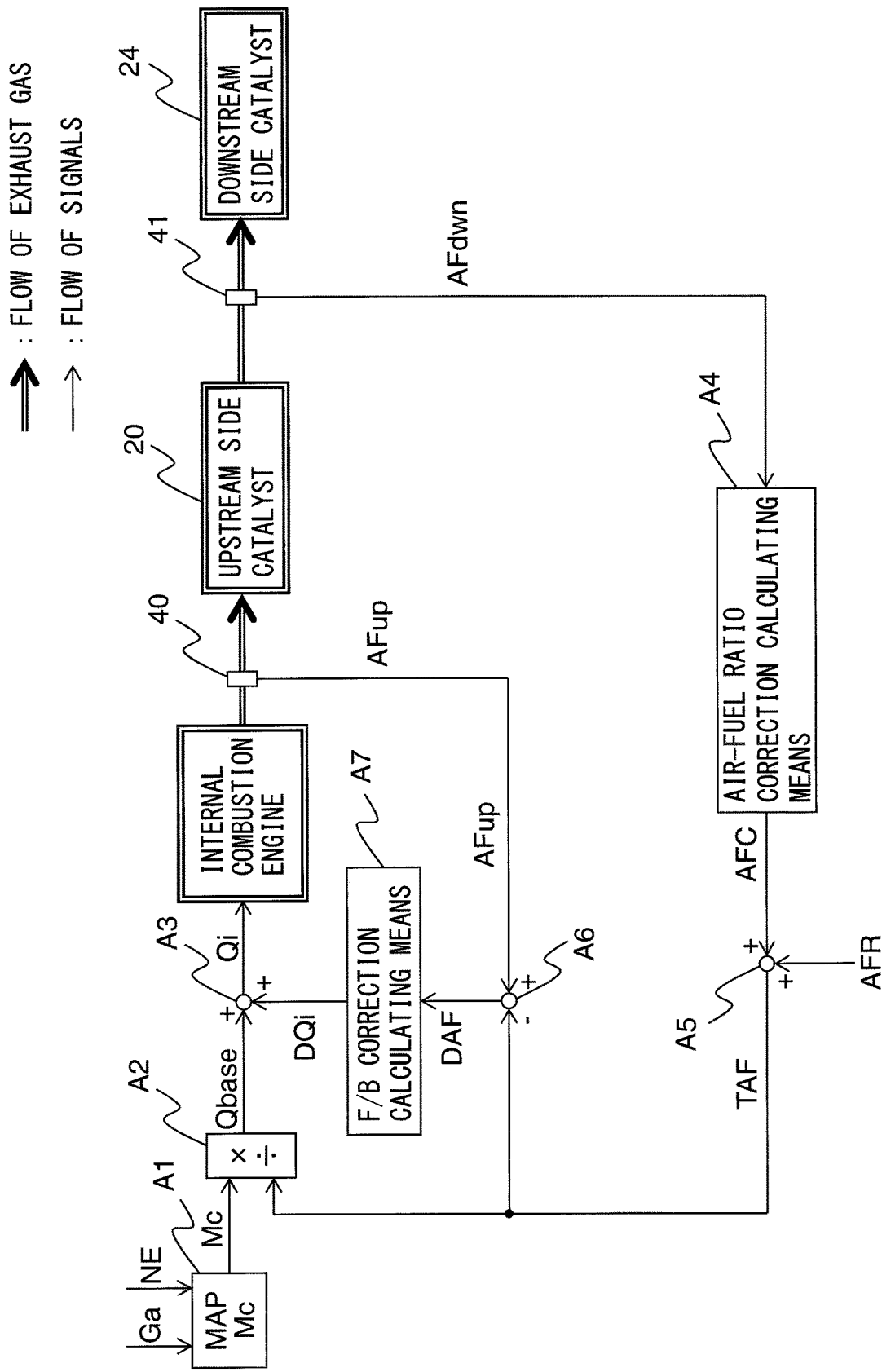
FIG. 6 is a block diagram of control of second control.

FIG. 6 is a block diagram of control of the second control. The air-fuel ratio control part 31 includes functional blocks A1 to A8. The functional blocks A1 to A7 in FIG. 6 are similar to the functional blocks A1 to A7 in FIG. 5.

In the second control, to calculate the target air-fuel ratio, the air-fuel ratio correction calculating means A4 and the target air-fuel ratio setting means A5 are used. In the air-fuel ratio correction calculating means A4, the air-fuel ratio correction amount AFC of the target air-fuel ratio is calculated based on the output air-fuel ratio AFdwn of the downstream side air-fuel ratio sensor 41. The target air-fuel ratio setting means A5 adds the air-fuel ratio correction amount AFC calculated by the air-fuel ratio correction calculating means A4 to the control center air-fuel ratio AFR (in the present embodiment, the stoichiometric air-fuel ratio) to calculate the target air-fuel ratio TAF.

Note that, if feedback control is not performed based on the output of the upstream side air-fuel ratio sensor 40, the air-fuel ratio difference calculating means A6 and F/B correction calculating means A7 are not used for air-fuel ratio control. In this case, the air-fuel ratio difference calculating means A6 and F/B correction calculating means A7 are omitted from the block diagram of control shown in FIG. 6.

Switching of First Control and Second Control

If the first control is performed, when the output air-fuel ratio of the downstream side air-fuel ratio sensor 41 reaches the first rich judged air-fuel ratio, unburned gas flows out from the upstream side catalyst 20. On the other hand, before the oxygen storage amount of the upstream side catalyst 20 reaches the maximum oxygen storage amount, the target air-fuel ratio is switched from the first lean set air-fuel ratio to the first rich set air-fuel ratio, so basically no $NO_X$ flows out from the upstream side catalyst 20.

Further, if the second control is performed, when the output air-fuel ratio of the downstream side air-fuel ratio sensor 41 reaches the rich judged air-fuel ratio, unburned gas flows out from the upstream side catalyst 20, while when the output air-fuel ratio of the downstream side air-fuel ratio sensor 41 reaches the lean judged air-fuel ratio, $NO_X$ flows out from the upstream side catalyst 20. When $NO_X$ flows out from the upstream side catalyst 20, oxygen together with $NO_X$ flows into the downstream side catalyst 24. For this reason, in the second control, unburned gas and oxygen alternately flow into the downstream side catalyst 24, so it is possible to periodically make the oxygen storage amount of the downstream side catalyst 24 fluctuate and possible to keep the oxygen storage ability of the downstream side catalyst 24 from falling. Further, due to the oxygen, it is possible to restore the downstream side catalyst 24 from the HC poisoning and sulfur poisoning and possible to keep the oxygen storage ability of the downstream side catalyst 24 from falling.

The upstream side catalyst 20 and the downstream side catalyst 24 can effectively remove the unburned gas and $NO_X$ when in the active state. Due to the exhaust gas, the upstream side catalyst 20 and the downstream side catalyst 24 are heated. When the temperatures of the upstream side catalyst 20 and the downstream side catalyst 24 reach the activation temperature, the upstream side catalyst 20 and the downstream side catalyst 24 become the active state. However, the downstream side catalyst 24 is arranged at the downstream side in the direction of flow of exhaust at the upstream side catalyst 20, so time is taken until the active state compared with the upstream side catalyst 20. In particular, if the internal combustion engine is started cold, time is taken until the downstream side catalyst 24 becomes the active state.

When the downstream side catalyst 24 is in the inactive state, the purification performance of the downstream side catalyst 24 falls, so a part of the unburned gas and $NO_X$ flowing into the downstream side catalyst 24 flows out from the downstream side catalyst 24 without being removed. For this reason, if second control is performed when the downstream side catalyst 24 is inactive, unburned gas and $NO_X$ flow out from the downstream side catalyst 24 and the exhaust emission is liable to deteriorate. On the other hand, if the first control is performed, basically, $NO_X$ does not flow out from the upstream side catalyst 20.

For this reason, in the present embodiment, the air-fuel ratio control part 31 switches from first control to second control when the temperature of the downstream side catalyst 24 calculated by the temperature calculating part 32 rises to a reference temperature which is equal to or higher than the activation temperature of the downstream side catalyst 24. Due to this, when the downstream side catalyst 24 is in the inactive state, $NO_X$ does not flow out from the upstream side catalyst 20, so it is possible to keep the exhaust emission from deteriorating.

Explanation of Air-Fuel Ratio Control Using Time Chart

Figure 7:
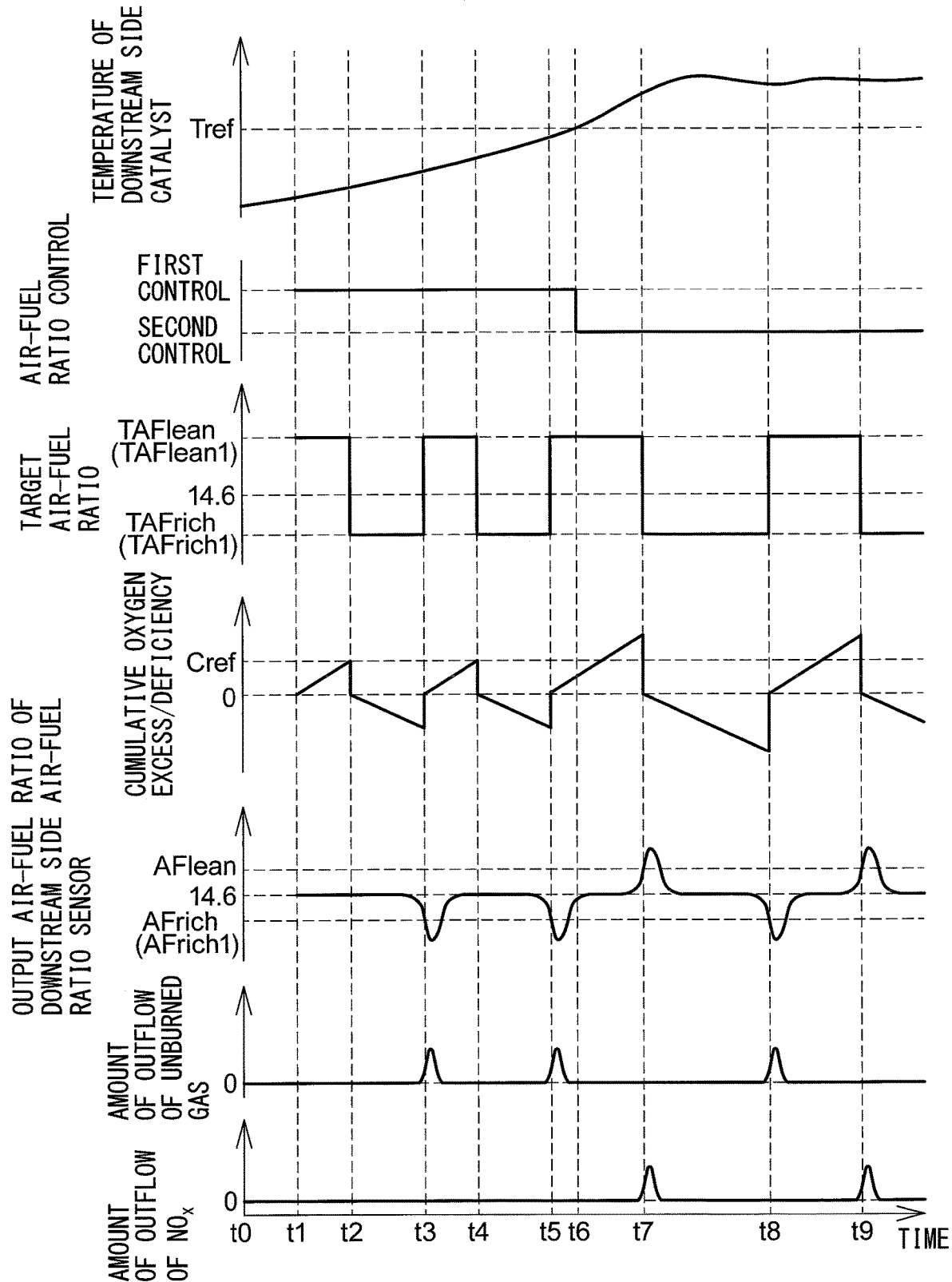
FIG. 7 is a time chart of the temperature of the downstream side catalyst etc., when air-fuel ratio control in the first embodiment is performed.

Referring to FIG. 7, the air-fuel ratio control in the present embodiment will be specifically explained. FIG. 7 is a time chart of the temperature of the downstream side catalyst 24, the type of the air-fuel ratio control, the target air-fuel ratio of the inflowing exhaust gas, the cumulative value of the oxygen excess/deficiency of the inflowing exhaust gas with respect to the stoichiometric air-fuel ratio (cumulative oxygen excess/deficiency), the output air-fuel ratio of the downstream side air-fuel ratio sensor 41, the amount of unburned gas flowing out from the upstream side catalyst 20, and the amount of the $NO_X$ flowing out from the upstream side catalyst 20, when the air-fuel ratio control in the first embodiment is performed.

In the illustrated example, at the time t0, the internal combustion engine is started. After that, at the time t1, the sensor elements of the air-fuel ratio sensors 40 and 41 become the active state and air-fuel ratio control using the air-fuel ratio sensors 40 and 41 is started. Note that, the sensor elements are heated by heaters.

At the time t1, the temperature of the downstream side catalyst 24 is lower than the reference temperature Tref. For this reason, at the time t1, the first control is started. In this example, at the time t1, the target air-fuel ratio is set to the first lean set air-fuel ratio TAFlean1. As a result, the air-fuel ratio of the inflowing exhaust gas becomes leaner than the stoichiometric air-fuel ratio and the upstream side catalyst 20 stores the excess oxygen in the inflowing exhaust gas. For this reason, the value of the oxygen excess/deficiency becomes positive.

After that, at the time t2, the cumulative oxygen excess/deficiency reaches the reference amount Cref. The reference amount Cref is smaller than the maximum oxygen storage amount of the upstream side catalyst 20, so at the time t2 the oxygen storage amount of the upstream side catalyst 20 does not reach the maximum oxygen storage amount. For this reason, almost no $NO_X$ and oxygen flow out from the upstream side catalyst 20.

At the time t2, to make the oxygen storage amount of the upstream side catalyst 20 decrease, the target air-fuel ratio is switched from the first lean set air-fuel ratio TAFlean1 to the first rich set air-fuel ratio TAFrich1. As a result, the air-fuel ratio of the inflowing exhaust gas becomes richer than the stoichiometric air-fuel ratio, and the upstream side catalyst 20 releases oxygen corresponding to the amount deficient for oxidizing the unburned gas. For this reason, the value of the oxygen excess/deficiency becomes negative. Further, at the time t2, the cumulative oxygen excess/deficiency is reset to zero. Note that, in this example, the difference of the first lean set air-fuel ratio TAFlean1 and the stoichiometric air-fuel ratio is larger than the difference of the first rich set air-fuel ratio TAFrich1 and the stoichiometric air-fuel ratio.

After that, when the oxygen storage amount of the upstream side catalyst 20 approaches zero, the output air-fuel ratio of the downstream side air-fuel ratio sensor 41 gradually falls and at the time t3 reaches the first rich judged air-fuel ratio AFrich1. At this time, unburned gas flows out from the upstream side catalyst 20.

To make the oxygen storage amount of the upstream side catalyst 20 increase, at the time t3, the target air-fuel ratio is switched from the first rich set air-fuel ratio TAFrich1 to the first lean set air-fuel ratio TAFlean1. Further, at the time t3, the cumulative oxygen excess/deficiency is reset to zero.

After that, at the time t4, the cumulative oxygen excess/deficiency reaches the reference amount Cref. For this reason, the target air-fuel ratio is switched from the first lean set air-fuel ratio TAFlean1 to the first rich set air-fuel ratio TAFrich1. After that, at the time t5, the output air-fuel ratio of the downstream side air-fuel ratio sensor 41 reaches the first rich judged air-fuel ratio AFrich1. For this reason, the target air-fuel ratio is switched from the first rich set air-fuel ratio TAFrich1 to the first lean set air-fuel ratio TAFlean1.

The downstream side catalyst 24 is heated by the exhaust gas after startup of the internal combustion engine. The temperature of the downstream side catalyst 24 gradually rises and, at the time t6, reaches the reference temperature Tref. The reference temperature Tref is equal to or higher than a temperature of the activation temperature. At the time t6, the downstream side catalyst 24 is in the active state. For this reason, at the time t6, the air-fuel ratio control is switched from the first control to the second control.

In the second control, the target air-fuel ratio is not switched even if the cumulative oxygen excess/deficiency reaches the reference amount Cref. As a result, the output air-fuel ratio of the downstream side air-fuel ratio sensor 41 gradually rises and at the time t7 reaches the lean judged air-fuel ratio AFlean. At this time, $NO_X$ and oxygen flow out from the upstream side catalyst 20. However, the downstream side catalyst 24 is in the active state, so the $NO_X$ flowing out from the upstream side catalyst 20 is removed at the downstream side catalyst 24.

At the time t7, the target air-fuel ratio is switched from the lean set air-fuel ratio TAFlean to the rich set air-fuel ratio TAFrich. Note that, in this example, the value of the lean set air-fuel ratio TAFlean is the same as the value of the first lean set air-fuel ratio TAFlean1, while the value of the rich set air-fuel ratio TAFrich is the same as the value of the first rich set air-fuel ratio TAFrich1.

After that, at the time t8, the output air-fuel ratio of the downstream side air-fuel ratio sensor 41 reaches the rich judged air-fuel ratio AFrich. At this time, unburned gas flows out from the upstream side catalyst 20. However, the downstream side catalyst 24 is in the active state, so the unburned gas flowing out from the upstream side catalyst 20 is removed at the downstream side catalyst 24. Note that, in this example, the value of the rich judged air-fuel ratio AFrich is the same as the value of the first rich judged air-fuel ratio AFrich1.

After that, at the time t9, the output air-fuel ratio of the downstream side air-fuel ratio sensor 41 reaches lean judged air-fuel ratio AFlean and the target air-fuel ratio is switched from the lean set air-fuel ratio TAFlean to the rich set air-fuel ratio TAFrich.

Note that, in the example of FIG. 7, the first rich set air-fuel ratio TAFrich1, the rich set air-fuel ratio TAFrich, the first lean set air-fuel ratio TAFlean1, and the lean set air-fuel ratio TAFlean are maintained at constant values, but these may be made to fluctuate. For example, immediately after switching the target air-fuel ratio, the rich degrees of the first rich set air-fuel ratio TAFrich1 and the rich set air-fuel ratio TAFrich may be made larger and then the rich degrees of these may be made smaller. Further, immediately after switching the target air-fuel ratio, the lean degrees of the first lean set air-fuel ratio TAFlean1 and the lean set air-fuel ratio TAFlean may be made larger and then the lean degrees of these may be made smaller. Note that, the "rich degree" means the difference between an air-fuel ratio richer than the stoichiometric air-fuel ratio and the stoichiometric air-fuel ratio, while the "lean degree" means the difference between an air-fuel ratio leaner than the stoichiometric air-fuel ratio and the stoichiometric air-fuel ratio.

Processing for Switching Air-Fuel Ratio Control

Figure 8:
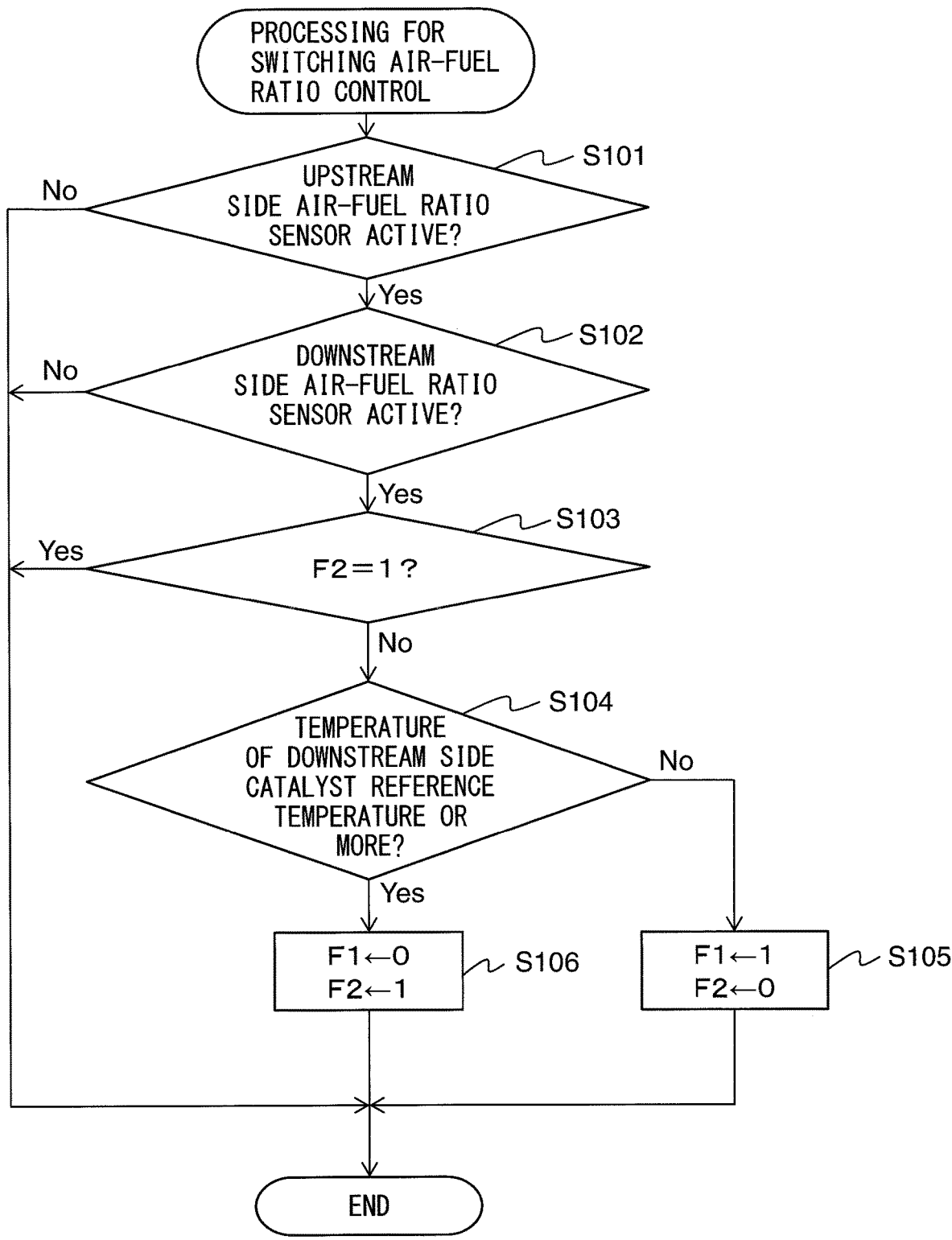
FIG. 8 is a flow chart showing a control routine of processing for switching air-fuel ratio control in the first embodiment.

FIG. 8 is a flow chart showing a control routine of processing for switching air-fuel ratio control in the first embodiment. The present control routine is repeatedly performed by the ECU 30 at predetermined time intervals after startup of the internal combustion engine.

First, at step S101, it is judged whether the upstream side air-fuel ratio sensor 40 is in the active state. When the temperature of the sensor element of the upstream side air-fuel ratio sensor 40 is equal to or higher than the activation temperature, it is judged that the upstream side air-fuel ratio sensor 40 is in the active state, while when the temperature of the sensor element of the upstream side air-fuel ratio sensor 40 is less than the activation temperature, it is judged that the upstream side air-fuel ratio sensor 40 is not in the active state. The temperature of the sensor element of the upstream side air-fuel ratio sensor 40 is, for example, calculated from the impedance of the sensor element.

If at step S101 it is judged that the upstream side air-fuel ratio sensor 40 is not in the active state, the present control routine ends. On the other hand, if it is judged that the upstream side air-fuel ratio sensor 40 is in the active state, the present control routine proceeds to step S102.

At step S102, it is judged whether the downstream side air-fuel ratio sensor 41 is in the active state. When the temperature of the sensor element of the downstream side air-fuel ratio sensor 41 is equal to or higher than the activation temperature, it is judged that the downstream side air-fuel ratio sensor 41 is in the active state, while when the temperature of the sensor element of the downstream side air-fuel ratio sensor 41 is less than the activation temperature, it is judged that the downstream side air-fuel ratio sensor 41 is not in the active state. The temperature of the sensor element of the downstream side air-fuel ratio sensor 41 is, for example, calculated from the impedance of the sensor element.

If at step S102 it is judged that the downstream side air-fuel ratio sensor 41 is not in the active state, the present control routine ends. On the other hand, if it is judged that the downstream side air-fuel ratio sensor 41 is in the active state, the present control routine proceeds to step S103.

At step S103, it is judged whether the second flag F2 is "1". The second flag F2 is set to "1" when the second control is performed, while it is set to "0" when the second control is not performed. The initial value of the second flag F2 is set to "0". Further, the second flag F2 is reset to "0" when the internal combustion engine stops.

If at step S103 it is judged that the second flag is "1", the present control routine ends. On the other hand, if it is judged that the second flag is "0", the present control routine proceeds to step S104.

At step S104, it is judged whether the temperature of the downstream side catalyst 24 is equal to or higher than the reference temperature. The temperature of the downstream side catalyst 24 is calculated by the temperature calculating part 32 by any of the above methods. The reference temperature is equal to or higher than a temperature of the activation temperature of the downstream side catalyst 24, for example, is the activation temperature of the downstream side catalyst 24. The activation temperature of the downstream side catalyst 24 is, for example, 350° C.

If at step S104 it is judged that the temperature of the downstream side catalyst 24 is less than the reference temperature, the present control routine proceeds to step S105. At step S105, the first flag F1 is set to "1", while the second flag F2 is set to "0". The first flag F1 is set to "1" when the first control is performed, while is set to "0" when the first control is not performed. The initial value of the first flag F1 is set to "0". Further, the first flag F1 is reset to "0" when the internal combustion engine stops. After step S105, the present control routine ends.

On the other hand, if at step S104 it is judged that the temperature of the downstream side catalyst 24 is equal to or higher than the reference temperature, the present control routine proceeds to step S106. At step S106, the first flag is set to "0", while the second flag is set to "1". After step S106, the present control routine ends.

In the present control routine, when the temperature of the downstream side catalyst 24 rises to the reference temperature, the first control is switched to the second control. After the first control is switched to the second control, the temperature of the downstream side catalyst 24 basically is maintained at the reference temperature or more due to heating by the exhaust gas. However, when the internal combustion engine is maintained in the idling state for a long period of time or when fuel cut control is performed for a long time, the temperature of the downstream side catalyst 24 sometimes falls to less than the reference temperature.

For this reason, the air-fuel ratio control part 31 may switch from the second control to the first control when the temperature of the downstream side catalyst 24 falls to less than the reference temperature. That is, the air-fuel ratio control part 31 performs the first control when the temperature of the downstream side catalyst 24 is less than the reference temperature and performs the second control when the temperature of the downstream side catalyst 24 is equal to or higher than the reference temperature. In this case, in the present control routine, step S103 is omitted. Due to this, deterioration of the exhaust emission can be kept from occurring more.

The temperature calculating part 32 judges that the temperature of the downstream side catalyst 24 has fallen to less than the reference temperature, for example, when the temperature of the downstream side catalyst 24 rises to the reference temperature, then the internal combustion engine is maintained at the idling state for a predetermined time or more or when the time of continuous execution of fuel cut control becomes a predetermined time or more. The predetermined time is determined in advance experimentally or theoretically.

Note that, the "idling state" means the state where a small amount of fuel is injected so that the engine speed becomes a predetermined idling speed (for example, 500 to 1000 rpm) when the amount of depression of the accelerator pedal 42 is zero (that is, the engine load is zero). Further, in fuel cut control, the injection of fuel from a fuel injector 11 is stopped to stop the supply of fuel to a combustion chamber 5. The fuel cut control is performed when a predetermined condition for execution of fuel cut control is satisfied. For example, the condition for execution of fuel cut control is satisfied when the amount of depression of the accelerator pedal 42 is zero or substantially zero (that is, the engine load is zero or substantially zero) and the engine speed is equal to or higher than a predetermined speed higher than the idling speed.

Figure 9:
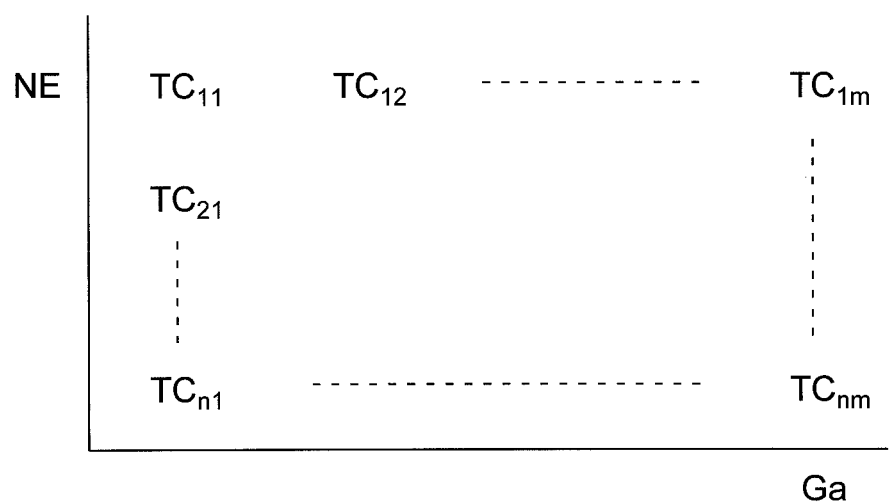
FIG. 9 is a map showing a relationship of an engine speed and an intake air amount and temperature of a downstream side catalyst.

Further, the temperature calculating part 32 may calculate the temperature of the downstream side catalyst 24 based on the engine speed and the intake air amount after the temperature of the downstream side catalyst 24 rises to the reference temperature. For example, the temperature calculating part 32 uses a map such as shown in FIG. 9 to calculate the temperature of the downstream side catalyst 24. In the map of FIG. 9, the temperature TC of the downstream side catalyst 24 is shown as a function of the engine speed NE and the intake air amount Ga. The engine speed is calculated based on the output of the crank angle sensor 44, while the intake air amount is detected by the air flow meter 39. Note that, instead of the intake air amount, the engine load may be used. The engine load is detected by the load sensor 43.

First Control

Figure 10:
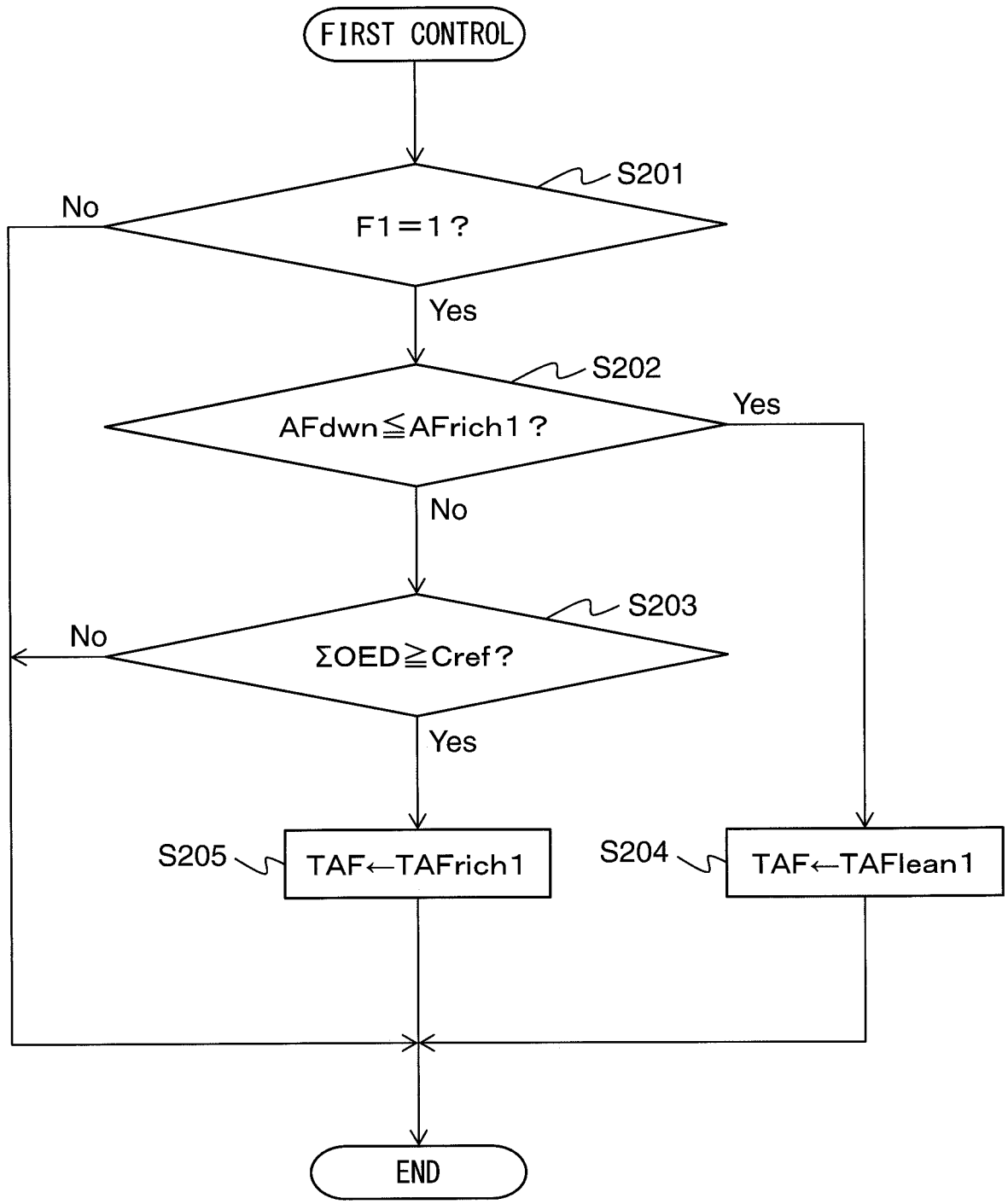
FIG. 10 is a flow chart showing a control routine of first control in the first embodiment.

FIG. 10 is a flow chart showing a control routine of the first control in the first embodiment. The present control routine is repeatedly performed by the ECU 30 at predetermined time intervals after startup of the internal combustion engine.

First, at step S201, it is judged whether the first flag F1 is "1". The first flag F1 is set in the control routine of the processing for switching the air-fuel ratio control of FIG. 8. If it is judged that the first flag F1 is "0", the present control routine ends. On the other hand, if it is judged that the first flag F1 is "1", the present control routine proceeds to step S202.

At step S202, it is judged whether the output air-fuel ratio AFdwn of the downstream side air-fuel ratio sensor 41 is equal to or less than the first rich judged air-fuel ratio AFrich1. If it is judged that the output air-fuel ratio AFdwn of the downstream side air-fuel ratio sensor 41 is equal to or less than the first rich judged air-fuel ratio AFrich1, the present control routine proceeds to step S204.

At step S204, the target air-fuel ratio TAF is set to the first lean set air-fuel ratio TAFlean1. After step S204, the present control routine ends. On the other hand, if at step S202 it is judged that the output air-fuel ratio AFdwn of the downstream side air-fuel ratio sensor 41 is higher than the first rich judged air-fuel ratio AFrich1, the present control routine proceeds to step S203.

At step S203, it is judged whether the cumulative oxygen excess/deficiency ΣOED is equal to or larger than the reference amount Cref. The reference amount Cref is, for example, set to a value smaller than the maximum oxygen storage amount of the upstream side catalyst 20 in the unused state (for example, a value of 0.2 to 0.8 time the maximum oxygen storage amount). Note that, the reference amount Cref may be set to a value smaller than the maximum oxygen storage amount of the upstream side catalyst 20 calculated by a known method when the second control is performed (for example, a value of 0.2 to 0.8 time the maximum oxygen storage amount).

The cumulative oxygen excess/deficiency ΣOED is calculated by cumulatively adding the oxygen excess/deficiency OED calculated by the above formula (1) or (2). Further, the cumulative oxygen excess/deficiency ΣOED is reset to zero when the target air-fuel ratio TAF is switched from the first rich set air-fuel ratio TAFrich1 to the first lean set air-fuel ratio TAFlean1 and when the target air-fuel ratio TAF is switched from the first lean set air-fuel ratio TAFlean1 to the first rich set air-fuel ratio TAFrich1.

If at step S203 it is judged that the cumulative oxygen excess/deficiency ΣOED is less than the reference amount Cref, the present control routine ends. In this case, the target air-fuel ratio TAF is maintained at the current value. On the other hand, if at step S203 it is judged that the cumulative oxygen excess/deficiency ΣOED is equal to or larger than the reference amount Cref, the present control routine proceeds to step S205. At step S205, the target air-fuel ratio TAF is set to the first rich target air-fuel ratio TAFrich1. After step S205, the present control routine ends.

Second Control

Figure 11:
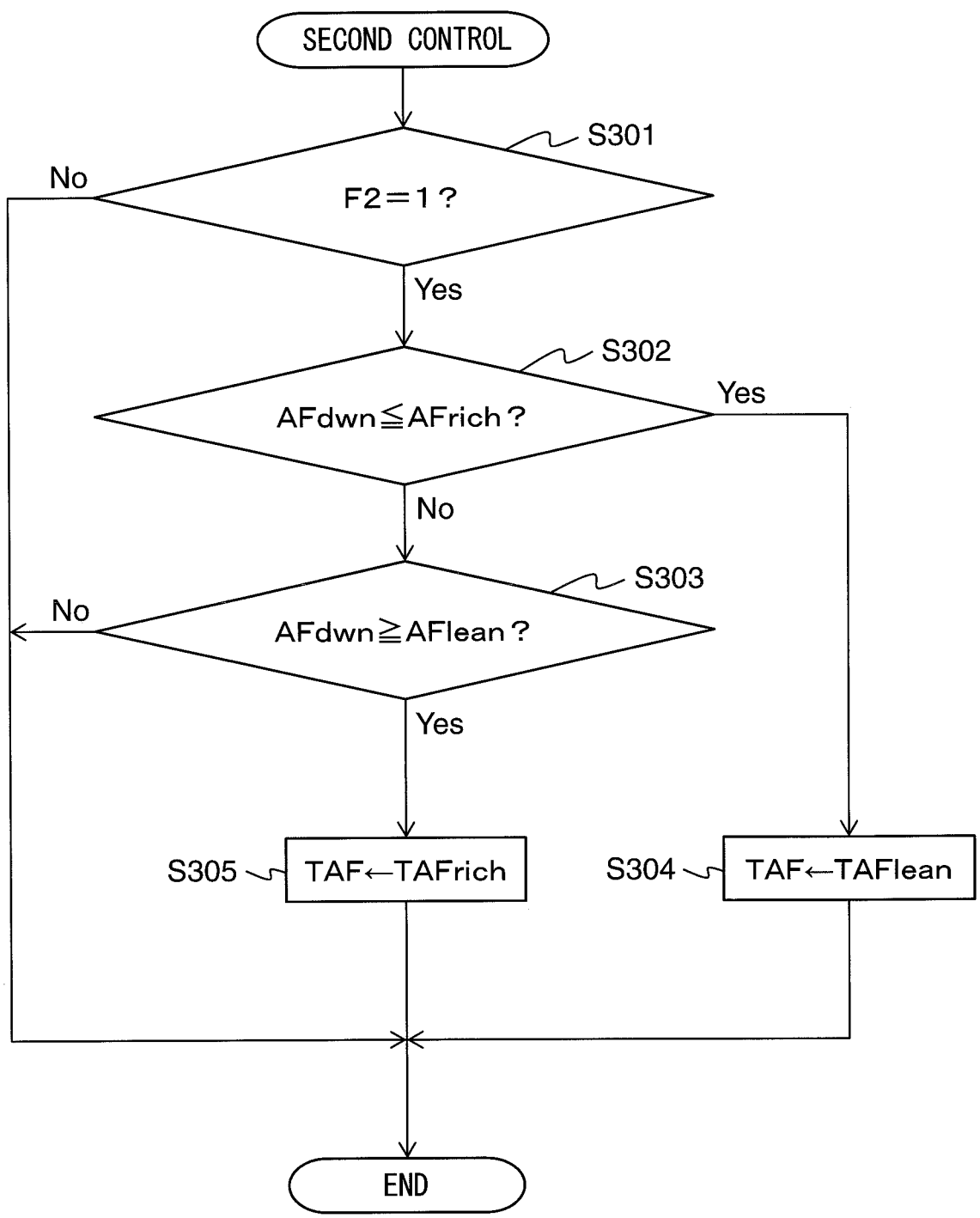
FIG. 11 is a flow chart showing a control routine of second control in the first embodiment.

FIG. 11 is a flow chart showing a control routine of the second control in the first embodiment. The present control routine is repeatedly performed by the ECU 30 at predetermined time intervals after startup of the internal combustion engine.

First, at step S301, it is judged whether the second flag F2 is "1". The second flag F2 is set in the control routine of the processing for switching the air-fuel ratio control of FIG. 8. If it is judged that the second flag F2 is "0", the present control routine ends. On the other hand, if it is judged that the second flag F2 is "1", the present control routine proceeds to step S302.

At step S302, it is judged whether the output air-fuel ratio AFdwn of the downstream side air-fuel ratio sensor 41 is equal to or less than the rich judged air-fuel ratio AFrich. If it is judged that the output air-fuel ratio AFdwn of the downstream side air-fuel ratio sensor 41 is equal to or less than the rich judged air-fuel ratio AFrich, the present control routine proceeds to step S304.

At step S304, the target air-fuel ratio TAF is set to the lean set air-fuel ratio TAFlean. After step S304, the present control routine ends. On the other hand, if at step S302 it is judged that the output air-fuel ratio AFdwn of the downstream side air-fuel ratio sensor 41 is higher than the rich judged air-fuel ratio AFrich, the present control routine proceeds to step S303.

At step S303, it is judged whether the output air-fuel ratio AFdwn of the downstream side air-fuel ratio sensor 41 is equal to or larger than the lean judged air-fuel ratio AFlean. If it is judged that the output air-fuel ratio AFdwn of the downstream side air-fuel ratio sensor 41 is less than the lean judged air-fuel ratio AFlean, the present control routine ends. In this case, the target air-fuel ratio TAF is maintained at the current value.

On the other hand, if it is judged that the output air-fuel ratio AFdwn of the downstream side air-fuel ratio sensor 41 is equal to or larger than the lean judged air-fuel ratio AFlean, the present control routine proceeds to step S305. At step S305, the target air-fuel ratio TAF is set to the rich set air-fuel ratio TAFrich. After step S305, the present control routine ends.

Second Embodiment

The configuration and control of the exhaust purification system of the internal combustion engine in a second embodiment are basically similar to the exhaust purification system of the internal combustion engine in the first embodiment except for the points explained below. For this reason, below, the second embodiment of the present invention will be explained focusing on the parts different from the first embodiment.

In the second embodiment, in the first control, the first side is the lean side, and the second side is the rich side. In this case, the first control is also called "lean failure control" and is performed as follows: The air-fuel ratio control part 31 sets the target air-fuel ratio to a second rich set air-fuel ratio richer than the stoichiometric air-fuel ratio when the output air-fuel ratio of the downstream side air-fuel ratio sensor 41 reaches a second lean judged air-fuel ratio leaner than the stoichiometric air-fuel ratio. Further, the air-fuel ratio control part 31 sets the target air-fuel ratio to a second lean set air-fuel ratio leaner than the stoichiometric air-fuel ratio when the amount of change of the oxygen storage amount of the upstream side catalyst 20 when the target air-fuel ratio is maintained at an air-fuel ratio richer than the stoichiometric air-fuel ratio reaches the reference amount.

The second rich set air-fuel ratio, the second lean set air-fuel ratio, and the second lean judged air-fuel ratio are preset. The second rich set air-fuel ratio is, for example, 14 to 14.5. The second rich set air-fuel ratio may be a value the same as or a value different from the rich set air-fuel ratio in the second control. The second lean set air-fuel ratio is, for example, 14.7 to 16.5. The second lean set air-fuel ratio may be a value the same as or a value different from the lean set air-fuel ratio in the second control. The second lean judged air-fuel ratio is an air-fuel ratio richer than the second lean set air-fuel ratio, for example, is 14.65. The second lean judged air-fuel ratio may be a value the same as or a value different from the lean judged air-fuel ratio in the second control. The reference amount is preset and is set to a value smaller than the maximum oxygen storage amount of the upstream side catalyst 20.

If the first control is performed, when the output air-fuel ratio of the downstream side air-fuel ratio sensor 41 reaches the first lean judged air-fuel ratio, $NO_X$ and oxygen flow out from the upstream side catalyst 20. On the other hand, basically unburned gas does not flow out from the upstream side catalyst 20, since the target air-fuel ratio is switched from the second rich set air-fuel ratio to the second lean set air-fuel ratio before the oxygen storage amount of the upstream side catalyst 20 reaches zero.

For this reason, in the second embodiment, in the same way as the first embodiment, the air-fuel ratio control part 31 switches the first control to the second control when the temperature of the downstream side catalyst 24 calculated by the temperature calculating part 32 rises to the reference temperature of the activation temperature of the downstream side catalyst 24 or becomes more. Due to this, when the downstream side catalyst 24 is in the inactive state, unburned gas does not flow out from the upstream side catalyst 20, so it is possible to keep the exhaust emission from deteriorating.

Further, in the same way as the first embodiment, the air-fuel ratio control part 31 may switch the second control to the first control when the temperature of the downstream side catalyst 24 falls to less than the reference temperature. That is, the air-fuel ratio control part 31 may perform first control when the temperature of the downstream side catalyst 24 is less than the reference temperature and may perform second control when the temperature of the downstream side catalyst 24 is equal to or higher than the reference temperature. Due to this, deterioration of the exhaust emission can be suppressed even more.

Explanation of Air-Fuel Ratio Control Using Time Chart

Figure 12:
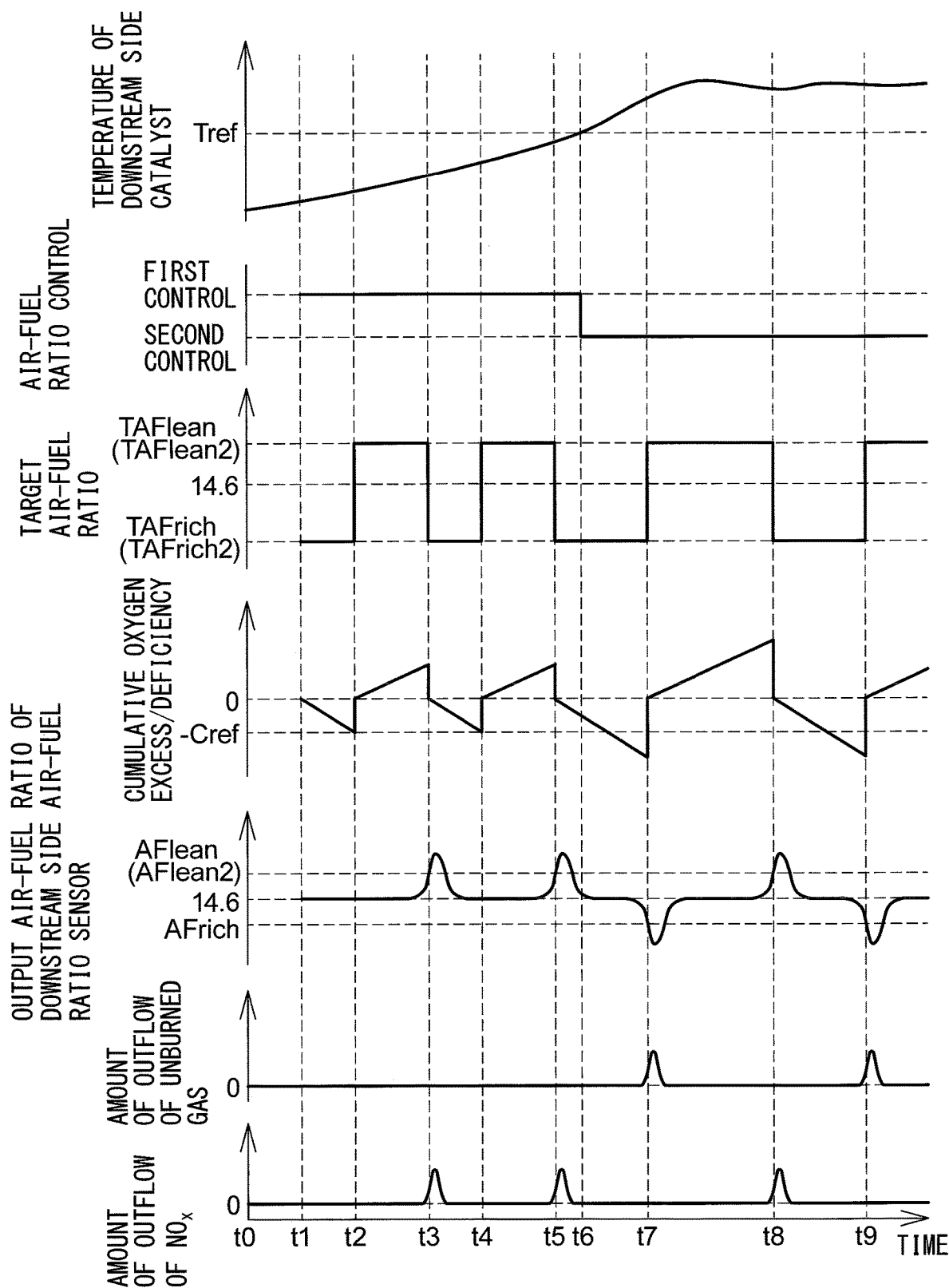
FIG. 12 is a time chart of the temperature of the downstream side catalyst etc., when air-fuel ratio control in the second embodiment is performed.

Referring to FIG. 12, the air-fuel ratio control in the second embodiment will be specifically explained. FIG. 12 is a time chart of the temperature of the downstream side catalyst 24, the type of air-fuel ratio control, the target air-fuel ratio of the inflowing exhaust gas, the cumulative value of the oxygen excess/deficiency of the inflowing exhaust gas with respect to the stoichiometric air-fuel ratio (cumulative oxygen excess/deficiency), the output air-fuel ratio of the downstream side air-fuel ratio sensor 41, the amount of unburned gas flowing out from the upstream side catalyst 20, and the amount of the $NO_X$ flowing out from the upstream side catalyst 20, when the air-fuel ratio control in the second embodiment is performed.

In the illustrated example, at the time t0, the internal combustion engine is started. After that, at the time t1, the sensor elements of the air-fuel ratio sensors 40 and 41 become the active state, and air-fuel ratio control using the air-fuel ratio sensors 40 and 41 is started. Note that, the sensor elements are heated by heaters.

At the time t1, the temperature of the downstream side catalyst 24 is lower than the reference temperature Tref. For this reason, at the time t1, the first control is started. In this example, at the time t1, the target air-fuel ratio is set to the second rich set air-fuel ratio TAFrich2. As a result, the air-fuel ratio of the inflowing exhaust gas becomes richer than the stoichiometric air-fuel ratio and the upstream side catalyst 20 releases oxygen corresponding to the amount deficient for oxidizing the unburned gas. For this reason, the value of the oxygen excess/deficiency becomes negative.

After that, at the time t2, the absolute value of the cumulative oxygen excess/deficiency reaches the reference amount Cref. The reference amount Cref is smaller than the maximum oxygen storage amount of the upstream side catalyst 20, so at the time t2, the oxygen storage amount of the upstream side catalyst 20 does not reach zero. For this reason, almost no unburned gas flows out from the upstream side catalyst 20.

At the time t2, to make the oxygen storage amount of the upstream side catalyst 20 increase, the target air-fuel ratio is switched from the second rich set air-fuel ratio TAFrich2 to the second lean set air-fuel ratio TAFlean2. As a result, the air-fuel ratio of the inflowing exhaust gas becomes leaner than the stoichiometric air-fuel ratio and the upstream side catalyst 20 stores excess oxygen in the inflowing exhaust gas. For this reason, the oxygen excess/deficiency becomes a positive value. Further, at the time t2, the cumulative oxygen excess/deficiency ΣOED is reset to zero. Note that, in this example, the difference of the second rich set air-fuel ratio TAFrich2 and the stoichiometric air-fuel ratio is larger than the difference of the second lean set air-fuel ratio TAFlean2 and the stoichiometric air-fuel ratio.

After that, if the oxygen storage amount of the upstream side catalyst 20 approaches the maximum oxygen storage amount, the output air-fuel ratio of the downstream side air-fuel ratio sensor 41 gradually rises and, at the time t3, reaches the second lean judged air-fuel ratio AFlean2. At this time, $NO_X$ and oxygen flow out from the upstream side catalyst 20.

To make the oxygen storage amount of the upstream side catalyst 20 decrease, at the time t3, the target air-fuel ratio is switched from the second lean set air-fuel ratio TAFlean2 to the second rich set air-fuel ratio TAFrich2. Further, at the time t3, the cumulative oxygen excess/deficiency ΣOED is reset to zero.

After that, at the time t4, the absolute value of the cumulative oxygen excess/deficiency reaches the reference amount Cref. For this reason, the target air-fuel ratio is switched from the second rich set air-fuel ratio TAFrich2 to the second lean set air-fuel ratio TAFlean2. After that, the output air-fuel ratio of the downstream side air-fuel ratio sensor 41 reaches the second lean judged air-fuel ratio AFlean2 at the time t5. For this reason, the target air-fuel ratio is switched from the second lean set air-fuel ratio TAFlean2 to the second rich set air-fuel ratio TAFrich2.

The downstream side catalyst 24 is heated by exhaust gas after startup of the internal combustion engine. The temperature of the downstream side catalyst 24 gradually rises and, at the time t6, reaches the reference temperature Tref. The reference temperature Tref is equal to or higher than a temperature of the activation temperature. At the time t6, the downstream side catalyst 24 is in the active state. For this reason, at the time t6, air-fuel ratio control is switched from the first control to the second control.

In the second control, even if the absolute value of the cumulative oxygen excess/deficiency reaches the reference amount Cref, the target air-fuel ratio is not switched. As a result, the output air-fuel ratio of the downstream side air-fuel ratio sensor 41 gradually falls and, at the time t7, reaches the rich judged air-fuel ratio AFrich. At this time, unburned gas flows out from the upstream side catalyst 20. However, the downstream side catalyst 24 is in the active state, so the unburned gas flowing out from the upstream side catalyst 20 is removed at the downstream side catalyst 24.

At the time t7, the target air-fuel ratio is switched from the rich set air-fuel ratio TAFrich to the lean set air-fuel ratio TAFlean. Note that, in this example, the value of the lean set air-fuel ratio TAFlean is the same as the value of the second lean set air-fuel ratio TAFlean2, while the value of the rich set air-fuel ratio TAFrich is the same as the value of the second rich set air-fuel ratio TAFrich2.

After that, at the time t8, the output air-fuel ratio of the downstream side air-fuel ratio sensor 41 reaches the lean judged air-fuel ratio AFlean. At this time, $NO_X$ and oxygen flow out from the upstream side catalyst 20. However, the downstream side catalyst 24 is in the active state, so the $NO_X$ flowing out from the upstream side catalyst 20 is removed at the downstream side catalyst 24. Note that, in this example, the value of the lean judged air-fuel ratio AFlean is the same as the value of the second lean judged air-fuel ratio AFlean2.

After that, at the time t9, the output air-fuel ratio of the downstream side air-fuel ratio sensor 41 reaches the rich judged air-fuel ratio AFrich and the target air-fuel ratio is switched from the rich set air-fuel ratio TAFrich to the lean set air-fuel ratio TAFlean.

Note that, in the example of FIG. 12, the second rich set air-fuel ratio TAFrich2, the rich set air-fuel ratio TAFrich, the second lean set air-fuel ratio TAFlean2, and the lean set air-fuel ratio TAFlean are maintained at constant values, but these may be made to fluctuate. For example, immediately after switching the target air-fuel ratio, the rich degrees of the second rich set air-fuel ratio TAFrich2 and the rich set air-fuel ratio TAFrich may be made larger and then the rich degrees of these may be made smaller. Further, immediately after switching the target air-fuel ratio, the lean degrees of the second lean set air-fuel ratio TAFlean2 and the lean set air-fuel ratio TAFlean may be made larger and then the lean degrees of these may be made smaller.

First Control

Figure 13:
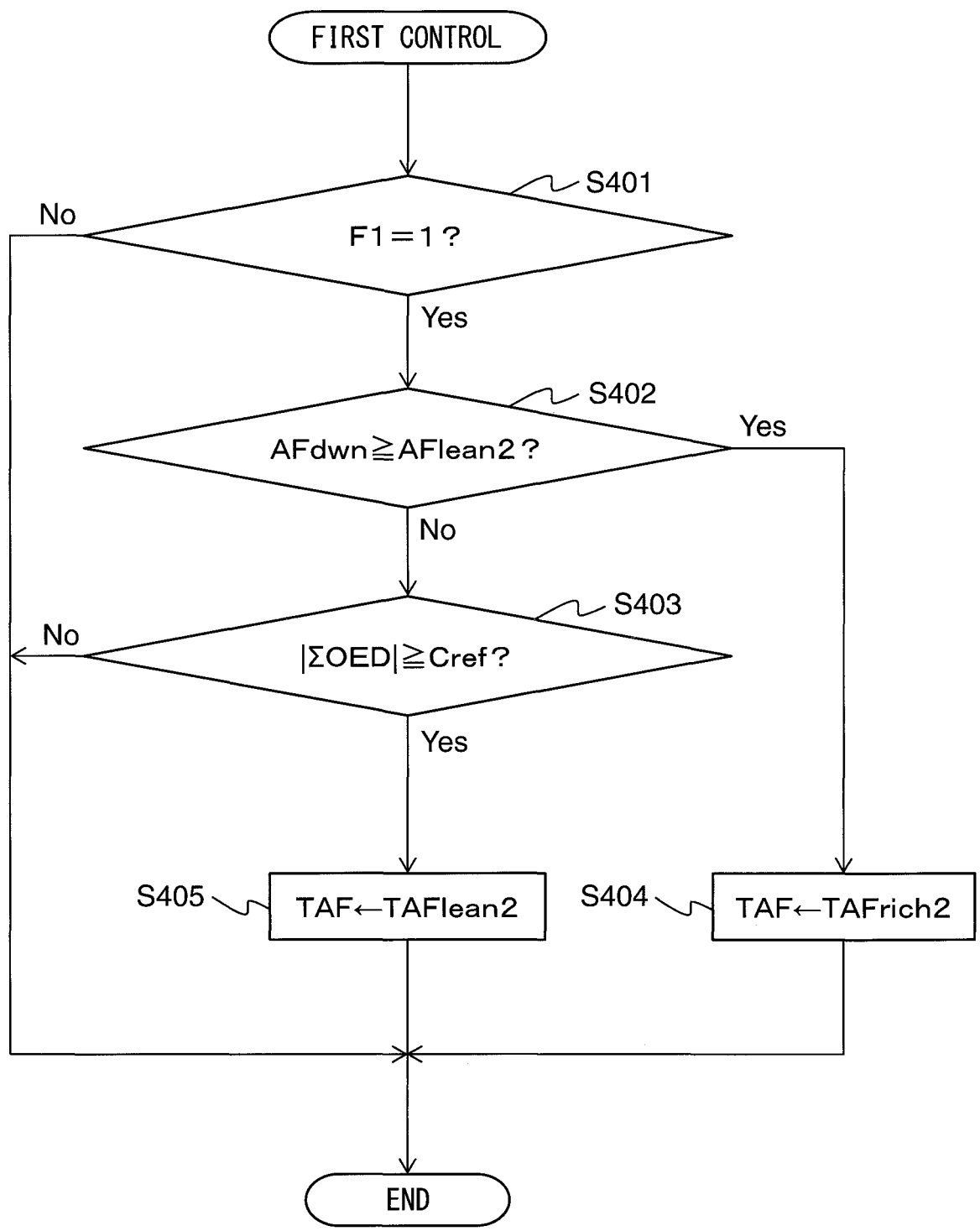
FIG. 13 is a flow chart showing a control routine of first control in a second embodiment.

In the second embodiment as well, in the same way as the first embodiment, the control routine of the processing for switching the air-fuel ratio control of FIG. 8 and the control routine of the second control of FIG. 11 are performed. FIG. 13 is a flow chart showing a control routine of the first control in the second embodiment. The present control routine is repeatedly performed by the ECU 30 at predetermined time intervals after startup of the internal combustion engine.

First, at step S401, it is judged whether the first flag F1 is "1". The first flag F1 is set in the control routine of processing for switching the air-fuel ratio control of FIG. 8. If it is judged that the first flag F1 is "0", the present control routine ends. On the other hand, if it is judged that the first flag F1 is "1", the present control routine proceeds to step S402.

At step S402, it is judged whether the output air-fuel ratio AFdwn of the downstream side air-fuel ratio sensor 41 is equal to or larger than the second lean judged air-fuel ratio AFrich2. If it is judged that the output air-fuel ratio AFdwn of the downstream side air-fuel ratio sensor 41 is equal to or larger than the second lean judged air-fuel ratio AFlean2, the present control routine proceeds to step S404.

At step S404, the target air-fuel ratio TAF is set to the second rich set air-fuel ratio TAFrich2. After step S404, the present control routine ends. On the other hand, if at step S402 it is judged that the output air-fuel ratio AFdwn of the downstream side air-fuel ratio sensor 41 is less than the second lean judged air-fuel ratio AFlean2, the present control routine proceeds to step S403.

At step S403, it is judged whether the absolute value of the cumulative oxygen excess/deficiency ΣOED is equal to or larger than the reference amount Cref. The reference amount Cref, for example, is set to a value smaller than the maximum oxygen storage amount of the upstream side catalyst 20 in the unused state (for example, a value of 0.2 to 0.8 time the maximum oxygen storage amount). Note that, the reference amount Cref may be set to a value smaller than the maximum oxygen storage amount of the upstream side catalyst 20 calculated by a known method when the second control is performed (for example, a value of 0.2 to 0.8 time the maximum oxygen storage amount).

The cumulative oxygen excess/deficiency ΣOED is calculated by cumulatively adding the oxygen excess/deficiency OED calculated by the above formula (1) or (2). Further, the cumulative oxygen excess/deficiency ΣOED is reset to zero when the target air-fuel ratio TAF is switched from the second rich set air-fuel ratio TAFrich2 to the second lean set air-fuel ratio TAFlean2 and when the target air-fuel ratio TAF is switched from the second lean set air-fuel ratio TAFlean2 to the second rich set air-fuel ratio TAFrich2.

If at step S403 it is judged that the absolute value of the cumulative oxygen excess/deficiency ΣOED is less than the reference amount Cref, the present control routine ends. In this case, the target air-fuel ratio TAF is maintained at the current value. On the other hand, if at step S403 it is judged that the absolute value of the cumulative oxygen excess/deficiency ΣOED is equal to or larger than the reference amount Cref, the present control routine proceeds to step S405. At step S405, the target air-fuel ratio TAF is set to the second lean target air-fuel ratio TAFlean2. After step S405, the present control routine ends.

Third Embodiment

The configuration and control of the exhaust purification system of the internal combustion engine in the third embodiment are basically similar to the exhaust purification system of the internal combustion engine in the first embodiment except the points explained below. For this reason, below, the third embodiment of the present invention will be explained focusing on the parts different from the first embodiment.

Figure 14:
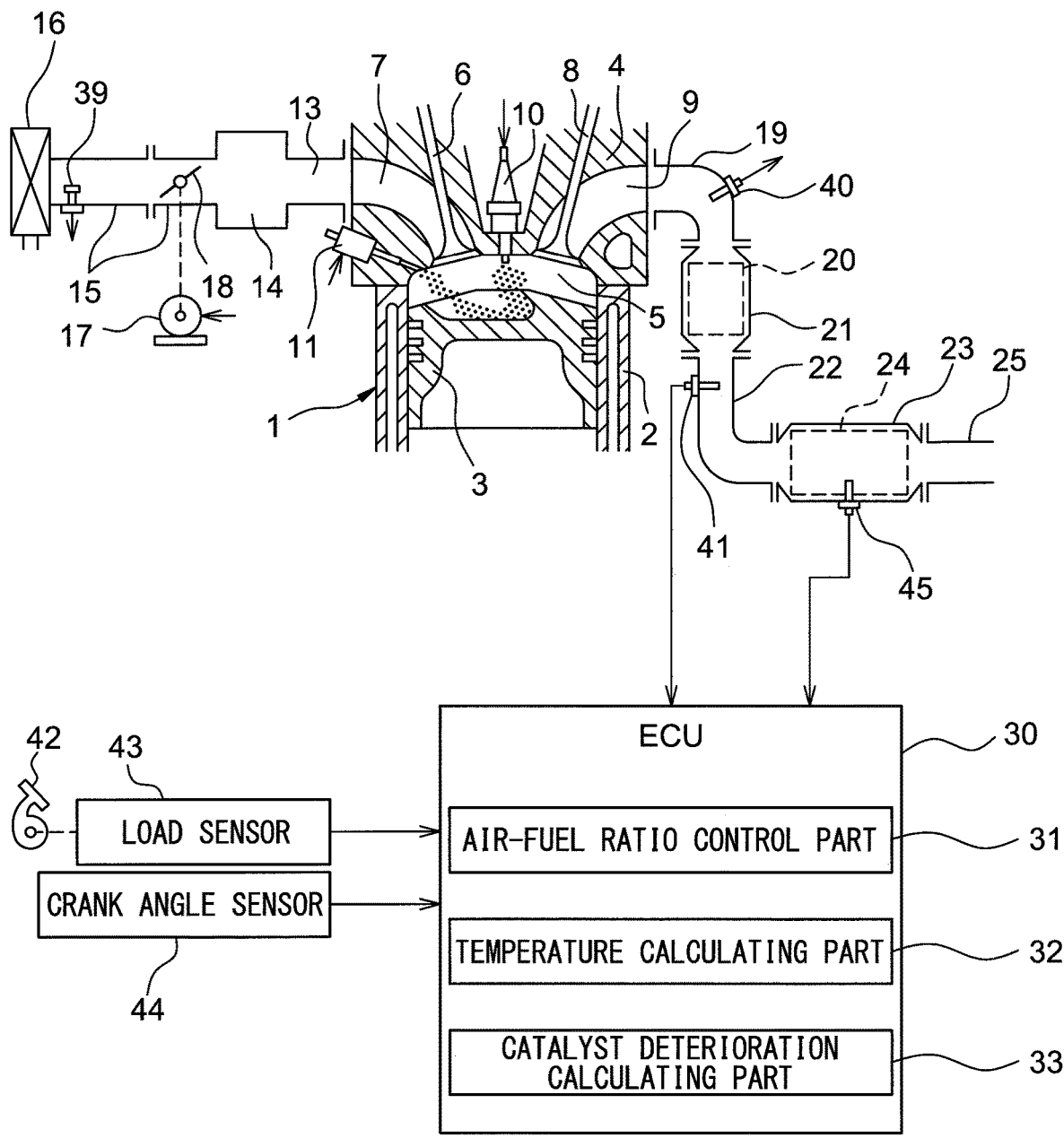
FIG. 14 is a view schematically showing an internal combustion engine in which an exhaust purification system of an internal combustion engine according to a second embodiment of the present invention is provided.

FIG. 14 is a view schematically showing an internal combustion engine in which an exhaust purification system of the internal combustion engine according to the second embodiment of the present invention is provided. The exhaust purification system comprises an upstream side catalyst 20, downstream side catalyst 24, upstream side air-fuel ratio sensor 40, downstream side air-fuel ratio sensor 41, air-fuel ratio control part 31, temperature calculating part 32 and catalyst deterioration calculating part 33. In the second embodiment, the ECU 30 functions as the air-fuel ratio control part 31, temperature calculating part 32, and catalyst deterioration calculating part 33.

The catalyst deterioration calculating part 33 calculates the degree of deterioration of the downstream side catalyst 24. If the downstream side catalyst 24 is exposed to high temperature exhaust gas, deterioration of the downstream side catalyst 24 progresses. For this reason, the catalyst deterioration calculating part 33 calculates the degree of deterioration of the downstream side catalyst 24 based on, for example, the history of the temperature of the downstream side catalyst 24. In this case, the catalyst deterioration calculating part 33, for example, cumulatively adds the value of the coefficient of deterioration corresponding to the temperature of the downstream side catalyst 24 multiplied with the time during which that temperature is maintained to calculate the degree of deterioration of the downstream side catalyst 24. The coefficient of deterioration is made larger the higher the temperature of the downstream side catalyst 24 and is made zero when less than the predetermined temperature. The temperature of the downstream side catalyst 24 is calculated by the temperature calculating part 32.

Further, if the downstream side catalyst 24 is exposed to a high temperature in a lean atmosphere, the degree of deterioration of the downstream side catalyst 24 becomes larger. Further, if fuel cut control is performed, since the downstream side catalyst 24 is supplied with only air, the lean degree of the gas flowing into the downstream side catalyst 24 becomes maximum. For this reason, the catalyst deterioration calculating part 33 may calculate the degree of deterioration of the downstream side catalyst 24 based on the history of the temperature of the downstream side catalyst 24 and the total of the time during which the fuel cut control is performed.

In this case, the catalyst deterioration calculating part 33 cumulatively adds the value of the coefficient of deterioration corresponding to the temperature of the downstream side catalyst 24 multiplied with the time period during which that temperature is maintained when, for example, fuel cut control is being performed, to calculate the degree of deterioration of the downstream side catalyst 24. The coefficient of deterioration is made larger the higher the temperature of the downstream side catalyst 24 and is made zero at less than the predetermined temperature. The temperature of the downstream side catalyst 24 is calculated by the temperature calculating part 32. Further, the catalyst deterioration calculating part 33 may calculate the degree of deterioration of the downstream side catalyst 24 based on the total of the time when the fuel cut control is performed and the temperature of the downstream side catalyst 24 is equal to or higher than a predetermined temperature. In this case, for example, a map showing the relationship of the total of the time and the degree of deterioration of the downstream side catalyst 24 is used. The longer the total of the time, the larger the degree of deterioration of the downstream side catalyst 24 is made.

Further, basically, the longer the time period during which the downstream side catalyst 24 is exposed to the exhaust gas, the larger the degree of deterioration of the downstream side catalyst 24 becomes. For this reason, the catalyst deterioration calculating part 33 may calculate the degree of deterioration of the downstream side catalyst 24 based on the total running distance of the vehicle mounting the internal combustion engine or the total operating time of the internal combustion engine. In this case, for example, a map showing the relationship of the total running distance or the total operating time and the degree of deterioration of the downstream side catalyst 24 is used. The longer the total running distance or the total operating time, the greater the degree of deterioration of the downstream side catalyst 24 is made.

The larger the degree of deterioration of the downstream side catalyst 24, the lower the purification performance of the downstream side catalyst 24 and the higher the activation temperature of the downstream side catalyst 24. For this reason, in the second embodiment, the air-fuel ratio control part 31 sets the reference temperature where the first control and the second control are switched based on the degree of deterioration of the downstream side catalyst 24 calculated by the catalyst deterioration calculating part 33. Specifically, the air-fuel ratio control part 31 raises the reference temperature the larger the degree of deterioration of the downstream side catalyst 24 calculated by the catalyst deterioration calculating part 33.

Processing for Setting Reference Temperature

Figure 15:
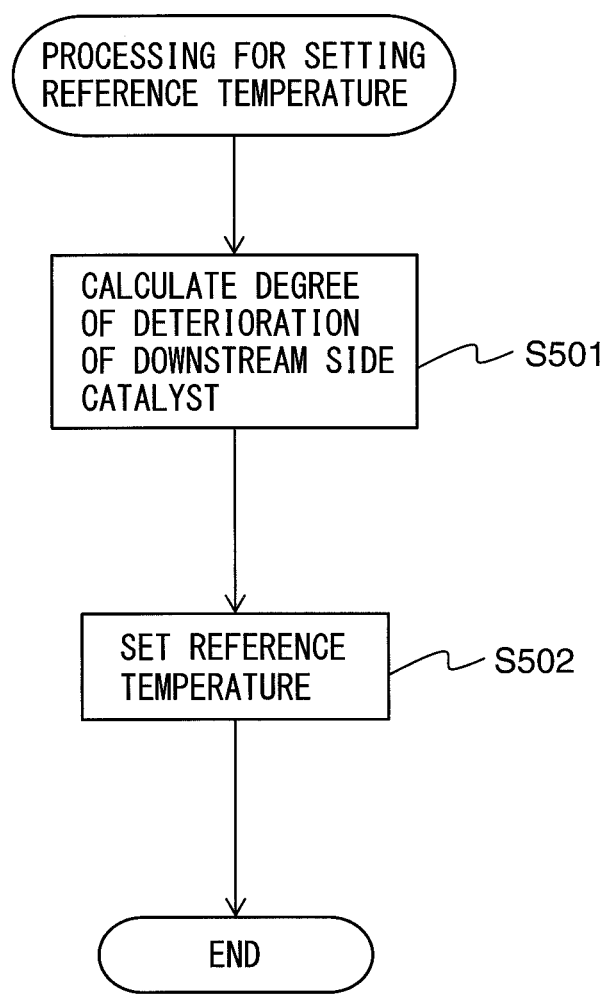
FIG. 15 is a flow chart showing a control routine of processing for setting a reference temperature in a third embodiment.

FIG. 15 is a flow chart showing a control routine of processing for setting a reference temperature in the third embodiment. The present control routine is repeatedly performed by the ECU 30 at predetermined time intervals after startup of the internal combustion engine.

First, at step S501, the degree of deterioration of the downstream side catalyst 24 is calculated by any of the above methods. Next, at step S502, the reference temperature is set based on the degree of deterioration of the downstream side catalyst 24. For example, a map showing the relationship of the degree of deterioration of the downstream side catalyst 24 and the reference temperature is used, and the reference temperature is made higher the larger the degree of deterioration of the downstream side catalyst 24. Note that, this map is prepared so that the reference temperature becomes the activation temperature of the downstream side catalyst 24 or more. Further, the activation temperature of the downstream side catalyst 24 may be calculated based on the degree of deterioration of the downstream side catalyst 24 and the reference temperature may be set to the calculated activation temperature.

After step S502, the present control routine ends. Note that, the set reference temperature is used at step S104 of FIG. 8.

Above, preferred embodiments according to the present invention were explained, but the present invention is not limited to these embodiments and can be modified and changed in various ways within the language of the claims. As explained above, the air-fuel ratio control of the inflowing exhaust gas and the oxygen excess/deficiency of the inflowing exhaust gas with respect to the stoichiometric air-fuel ratio may be calculated without using the upstream side air-fuel ratio sensor 40. For this reason, the upstream side air-fuel ratio sensor 40 may be omitted from the exhaust purification system.

REFERENCE SIGNS LIST

20. upstream side catalyst
24. downstream side catalyst
30. ECU
31. air-fuel ratio control part
32. temperature calculating part
33. catalyst deterioration calculating part
41. downstream side air-fuel ratio sensor

The invention claimed is:
1. An exhaust purification system of the internal combustion engine comprising:
an upstream side catalyst arranged in an exhaust passage and able to store oxygen;
a downstream side catalyst arranged at a downstream side of the upstream side catalyst in the direction of flow of exhaust and able to store oxygen;
an air-fuel ratio sensor arranged between the upstream side catalyst and the downstream side catalyst and detecting an air-fuel ratio of outflowing exhaust gas flowing out from the upstream side catalyst;
an air-fuel ratio control part configured to control an air-fuel ratio of inflowing exhaust gas flowing into the upstream side catalyst to a target air-fuel ratio; and
a temperature calculating part configured to calculate a temperature of the downstream side catalyst, wherein
the air-fuel ratio control part is configured to perform first control and second control,
in the first control, the air-fuel ratio control part is configured to set the target air-fuel ratio to a first set air-fuel ratio deviating from the stoichiometric air-fuel ratio to a second side at an opposite side from a first side when an air-fuel ratio detected by the air-fuel ratio sensor reaches a judged air-fuel ratio deviating to the first side from the stoichiometric air-fuel ratio, and set the target air-fuel ratio to a second set air-fuel ratio deviating to the first side from the stoichiometric air-fuel ratio when judging that an amount of change of an oxygen storage amount of the upstream side catalyst when the target air-fuel ratio is maintained at an air-fuel ratio deviating to the second side from the stoichio- metric air-fuel ratio has reached a reference amount smaller than a maximum oxygen storage amount of the upstream side catalyst, in the second control, the air-fuel ratio control part is configured to set the target air-fuel ratio to a lean set air-fuel ratio leaner than the stoichiometric air-fuel ratio when an air-fuel ratio detected by the air-fuel ratio sensor reaches a rich judged air-fuel ratio richer than the stoichiometric air-fuel ratio, and set the target air-fuel ratio to a rich set air-fuel ratio richer than the stoichiometric air-fuel ratio when the air-fuel ratio detected by the air-fuel ratio sensor reaches a lean judged air-fuel ratio leaner than the stoichiometric air-fuel ratio, and the air-fuel ratio control part is configured to switch the first control to the second control when a temperature of the downstream side catalyst calculated by the temperature calculating part rises to a reference temperature which is equal to or higher than an activation temperature of the downstream side catalyst.

2. The exhaust purification system of the internal combustion engine according to claim 1, wherein the air-fuel ratio control part is configured to switch the second control to the first control when a temperature of the downstream side catalyst calculated by the temperature calculating part has fallen to less than the reference temperature.

3. The exhaust purification system of the internal combustion engine according to claim 1, further comprising a catalyst deterioration calculating part configured to calculate a degree of deterioration of the downstream side catalyst, wherein the air-fuel ratio control part is configured to raise the reference temperature the larger the degree of deterioration of the downstream side catalyst calculated by the catalyst deterioration calculating part.

4. The exhaust purification system of the internal combustion engine according to claim 2, further comprising a catalyst deterioration calculating part configured to calculate a degree of deterioration of the downstream side catalyst, wherein the air-fuel ratio control part is configured to raise the reference temperature the larger the degree of deterioration of the downstream side catalyst calculated by the catalyst deterioration calculating part.

5. The exhaust purification system of the internal combustion engine according to claim 3, wherein the catalyst deterioration calculating part is configured to calculate the degree of deterioration of the downstream side catalyst based on a temperature history of the downstream side catalyst.

6. The exhaust purification system of the internal combustion engine according to claim 4, wherein the catalyst deterioration calculating part is configured to calculate the degree of deterioration of the downstream side catalyst based on a temperature history of the downstream side catalyst.

7. The exhaust purification system of the internal combustion engine according to claim 5, wherein the catalyst deterioration calculating part is configured to calculate the degree of deterioration of the downstream side catalyst based on a total of a time period during which fuel cut control where a supply of fuel to a combustion chamber of the internal combustion engine is stopped is performed.

8. The exhaust purification system of the internal combustion engine according to claim 6, wherein the catalyst deterioration calculating part is configured to calculate the degree of deterioration of the downstream side catalyst based on a total of a time period during which fuel cut control where a supply of fuel to a combustion chamber of the internal combustion engine is stopped is performed.

9. The exhaust purification system of the internal combustion engine according to claim 3, wherein the catalyst deterioration calculating part is configured to calculate the degree of deterioration of the downstream side catalyst based on a total running distance of a vehicle mounting the internal combustion engine or a total operating time of the internal combustion engine.

10. The exhaust purification system of the internal combustion engine according to claim 4, wherein the catalyst deterioration calculating part is configured to calculate the degree of deterioration of the downstream side catalyst based on a total running distance of a vehicle mounting the internal combustion engine or a total operating time of the internal combustion engine.

11. The exhaust purification system of the internal combustion engine according to claim 1, wherein the first side is a rich side and the second side is a lean side.

12. The exhaust purification system of the internal combustion engine according to claim 1, wherein the first side is a lean side and the second side is a rich side.

* * * * *